(12) United States Patent
Takeda

(10) Patent No.: US 8,587,853 B2
(45) Date of Patent: Nov. 19, 2013

(54) TWO-DIMENSIONAL OPTICAL SCANNER AND IMAGE DISPLAY APPARATUS

(75) Inventor: Hitoshi Takeda, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 367 days.

(21) Appl. No.: 12/882,590

(22) Filed: Sep. 15, 2010

(65) Prior Publication Data

US 2011/0063702 A1    Mar. 17, 2011

(30) Foreign Application Priority Data

Sep. 17, 2009  (JP) ................................ 2009-215297

(51) Int. Cl.
G02B 26/08    (2006.01)
(52) U.S. Cl.
USPC .................. 359/200.8; 359/202.1; 359/224.1; 359/904
(58) Field of Classification Search
USPC .......... 359/198.1–199.4, 200.6–200.8, 202.1, 359/221.2, 223.1–225.1, 226.2, 904, 359/290–295, 838, 846, 871, 872; 250/204, 250/559.06, 559.29, 230, 234; 347/255–260; 353/39, 98–99; 385/15–18, 22; 398/12, 19, 45
See application file for complete search history.

(56) References Cited

U.S. PATENT DOCUMENTS

| | | | |
|---|---|---|---|
| 6,188,504 B1 * | 2/2001 | Murakami et al. | 359/224.1 |
| 6,198,565 B1 * | 3/2001 | Iseki et al. | 359/224.1 |
| 6,388,789 B1 * | 5/2002 | Bernstein | 359/198.1 |
| 6,392,776 B1 * | 5/2002 | Murakami et al. | 359/224.1 |
| 2002/0171901 A1 * | 11/2002 | Bernstein | 359/199 |
| 2005/0253055 A1 * | 11/2005 | Sprague et al. | 250/234 |
| 2006/0250675 A1 * | 11/2006 | Willemsen et al. | 359/224 |
| 2007/0158552 A1 | 7/2007 | Kim et al. | |

FOREIGN PATENT DOCUMENTS

| | | |
|---|---|---|
| JP | UM-A-5-8525 | 2/1993 |
| JP | 2003-207737 | 7/2003 |
| JP | 2004-226548 | 8/2004 |
| JP | 2007-188073 | 7/2007 |
| JP | 2008-083246 | 4/2008 |
| JP | 2008-122622 | 5/2008 |

(Continued)

OTHER PUBLICATIONS

Japanese Official Action dated Dec. 28, 2012 from related application JP 2009-215297 together with an English language translation.

*Primary Examiner* — Jennifer L. Doak
(74) *Attorney, Agent, or Firm* — Scully, Scott, Murphy & Presser, P.C.

(57) ABSTRACT

A two-dimensional optical scanner and an image display apparatus are provided. The optical scanner includes: a movable portion having a mirror portion, and a first driving portion which is configured to oscillate the mirror portion around a first axis; a second driving portion which is configured to oscillate the movable portion around a second axis perpendicular to the first axis; and a driving controller which is configured to drive the first driving portion in a first driving method and is configured to drive the second driving portion in a second driving method different from the first driving method. While the first driving portion oscillates the mirror portion around the first axis, the second driving portion oscillates the movable portion around the second axis, so that the mirror portion reflects a beam of light incident to the mirror portion such that the two-dimensional optical scanner performs a two-dimensional scanning.

18 Claims, 16 Drawing Sheets

(56) References Cited

FOREIGN PATENT DOCUMENTS

| JP | 2008-170902 | 7/2008 |
| JP | 2008-191619 | 8/2008 |
| JP | 2009-169290 | 7/2009 |
| JP | 2009-210946 | 9/2009 |
| JP | 2009-258645 | 11/2009 |

* cited by examiner

TWO-DIMENSIONAL OPTICAL SCANNER AND IMAGE DISPLAY APPARATUS

CROSS-REFERENCE TO RELATED APPLICATION

This application claims priority from Japanese Patent Application No. 2009-215297, filed on Sep. 17, 2009, the entire subject matter of which is incorporated herein by reference.

TECHNICAL FIELD

Aspects of the present invention relate to a two-dimensional optical scanner and an image display apparatus.

BACKGROUND

In a related art, an optical scanner using a Micro-Electro-Mechanical System (MEMS) mirror has been used for a laser printer, a projection image display apparatus or the like. A driving method of the MEMS mirror, there are, for example, a piezoelectric driving method using a piezoelectric element, an electromagnetic driving method using a micro coil or the like, an electrostatic driving method using an electric potential difference between electrodes, and the like. As a driving method of a two-dimensional optical scanner, there are two types, that is, a same-kind driving method and a different kind-driving method. In the configuration of the same-kind driving method, oscillations of the mirror in one direction and in the other direction are generated in the same manner, whereas in the configuration of the different-kind driving method, the oscillations of the mirror in one direction and in the other direction are generated in different manners. In the two-dimensional optical scanner having the configuration of the same-kind driving method, a movement of the optical scanner for the mirror oscillating in one direction and a movement of the optical scanner for the mirror oscillating in the other direction may interfere with each other. Due to this interference, it is difficult to achieve a high accuracy driving control in the two-dimensional optical scanner having the configuration of the same-kind driving method.

FIG. 16 shows a related-art two-dimensional optical scanner 900 having the configuration of the different-kind driving method. The optical scanner 900 includes a fixed portion 910, a movable portion 920 and a spring portion 930. The fixed portion 910, the movable portion 920 and the spring portion 930 are formed by etching process on a crystal substrate. The movable portion 920 includes a mirror 921 and a coil 922. The spring portion 930 is connected with the fixed portion 910 and the movable portion 920, and supports the movable portion 920. The spring portion 930 undergoes torsional vibrations by an electromagnetic force generated by an interaction between an electric current flowing in the coil 922 of the movable portion 920 and a magnetic field MF applied to the movable portion 920. The mirror 921 of the movable portion 920 oscillates in an arrow direction AA by the torsional vibrations. Further, the spring portion 930 undergoes bending vibrations by the piezoelectricity of the crystal, and thus the mirror 921 of the movable portion 920 oscillates in an arrow direction BB. In this way, the mirror 921 of the related-art two-dimensional optical scanner 900 shown in FIG. 16 is driven in the two different-kind driving methods of the electromagnetic driving method and the piezoelectric driving method.

However, since the mirror 921 oscillates in two directions in the two-dimensional optical scanner 900 as shown in FIG. 16, it is required to generate two different types of vibrations of the torsional vibration and the bending vibration in the single spring portion 930. Thus, the two types of vibrations of the spring portion 930 interfere with each other, and therefore, it is difficult to achieve a high accuracy driving control of the two-dimensional optical scanner 900.

SUMMARY

Accordingly, it is an aspect of the present invention to provide a two-dimensional optical scanner with a high accuracy driving control and an image display apparatus including the optical scanner.

According to an illustrative embodiment of the present invention, there is provided a two-dimensional optical scanner comprising: a movable portion including a mirror portion which is configured to reflect a beam of light incident to the mirror portion, and a first driving portion which is configured to oscillate the mirror portion around a first axis; a second driving portion which is configured to oscillate the movable portion around a second axis perpendicular to the first axis; and a driving controller which is configured to drive the first driving portion in a first driving method and is configured to drive the second driving portion in a second driving method different from the first driving method. While the first driving portion oscillates the mirror portion around the first axis, the second driving portion oscillates the movable portion around the second axis, so that the mirror portion reflects a beam of light incident to the mirror portion such that the two-dimensional optical scanner performs a two-dimensional scanning.

According to another illustrative embodiment of the present invention, there is provided an image display apparatus comprising: the above-described optical scanner; a light source which is configured to emit a beam of light to the optical scanner; and an optical system which is configured to guide a beam of light scanned by the optical scanner to an eye of a user.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

First Illustrative Embodiment

A first illustrative embodiment of the present invention will be described with reference to the accompanying drawings.

[Outer Configuration of Optical Scanner]

Figure 1:
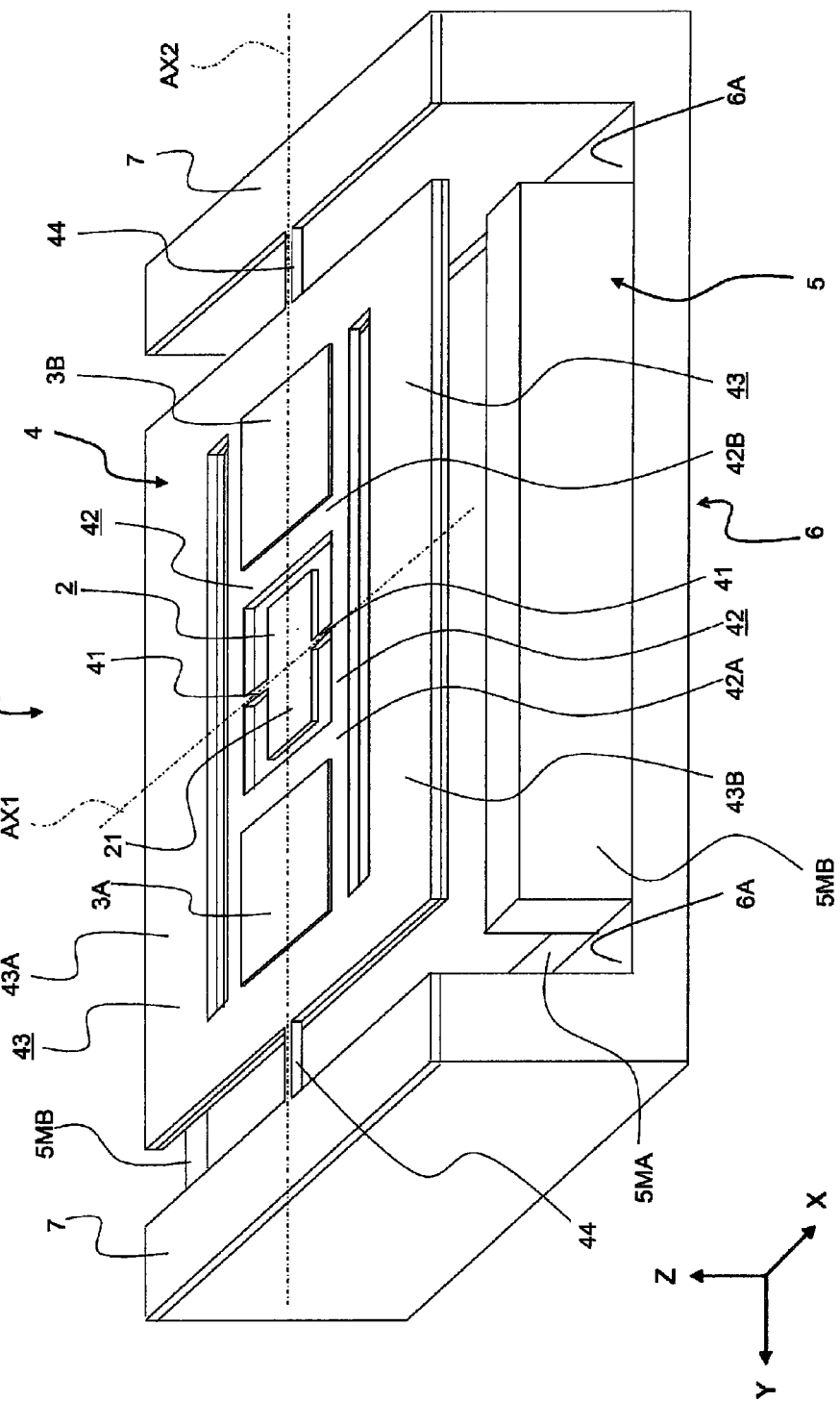
FIG. 1 is a perspective view illustrating an outer configuration of an optical scanner 1 according to a first illustrative embodiment of the present invention.
Figure 2:
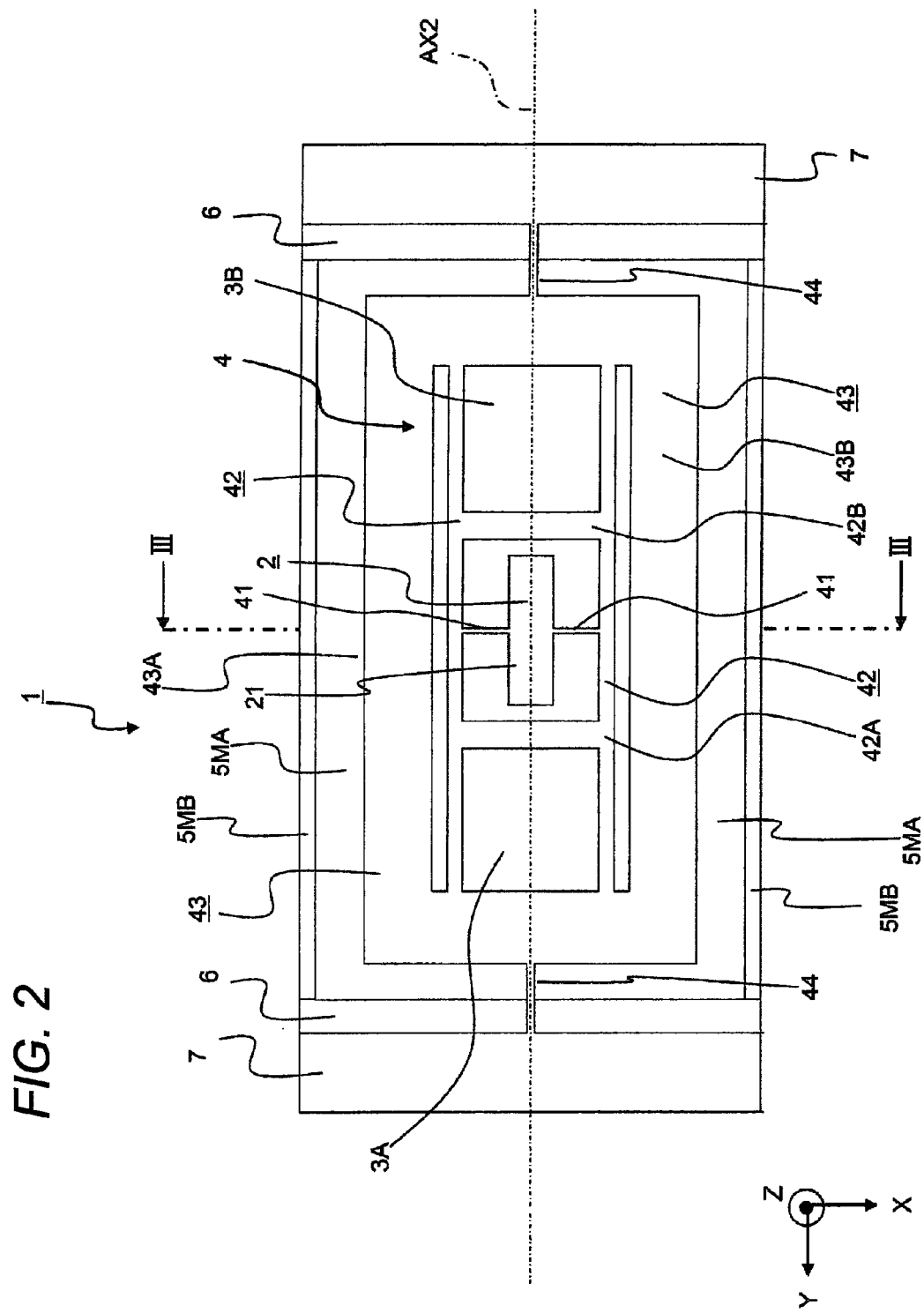
FIG. 2 is a top view of the optical scanner 1.
Figure 3:
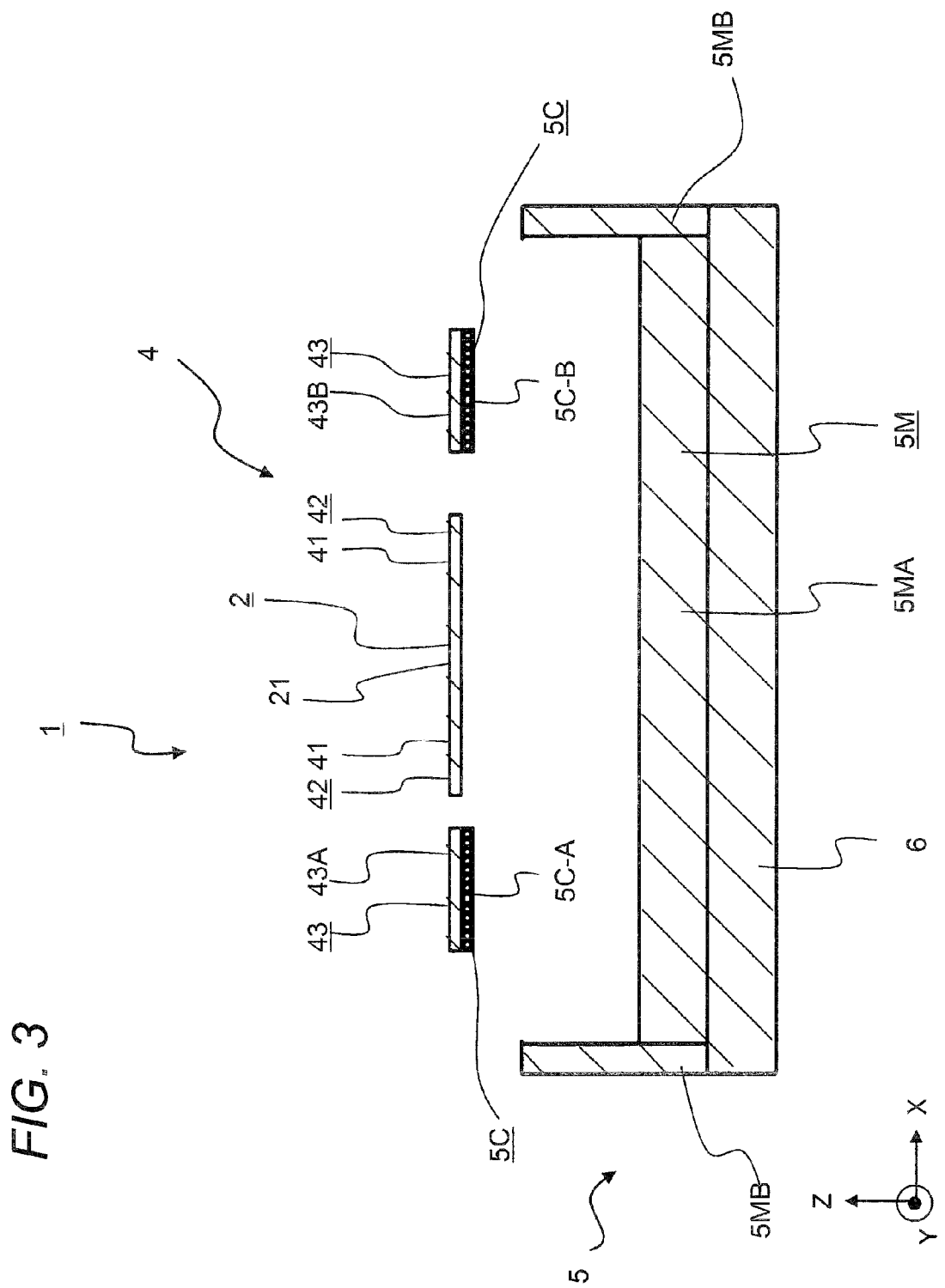
FIG. 3 is a sectional view taken along line of the optical scanner 1 shown in FIG. 2.

Hereinafter, an outer configuration of an optical scanner 1 according to the first illustrative embodiment will be described with reference to FIG. 1 to FIG. 5. As shown in FIG. 1 to FIG. 3, the optical scanner 1 includes a movable portion 4 including a mirror portion 2 and a pair of first driving portions 3A and 3B; a second driving portion 5; a base 6; and an installation portion 7. A line shown in FIG. 2 approximately coincides with an axis AX1 shown in FIG. 1.

The mirror portion 2 includes a reflective surface 21, as shown in FIG. 1 to FIG. 3. The reflective surface 21 reflects an incident beam of light.

The movable portion 4 includes a pair of first beams 41, a first frame 42, a second frame 43, and a pair of second beams 44. The movable portion 4 is formed of elastic materials. The pair of first beams 41, the first frame 42, the second frame 43, and the pair of second beams 44 are integrally formed. The pair of first beams 41 extends from both sides of the mirror portion 2 on a surface parallel to the reflective surface 21. Hereinafter, as shown in FIG. 1, a direction parallel to the pair of first beams 41 is defined as the X-axis direction, a direction perpendicular to the pair of first beams 41 on the surface parallel to the reflective surface 21 is defined as the Y-axis direction, and a direction perpendicular to the reflective surface 21 is defined as the Z-axis direction. Accordingly, for example, the surface parallel to the reflective surface 21 is referred to as an XY plane. Hereinafter, a term "upper" indicates a positive direction of the Z-axis shown in FIG. 1, and a term "lower" indicates a negative direction of the Z-axis shown in FIG. 1. The definitions of the X-axis direction, the Y-axis direction and the Z-axis direction are common in the other drawings. The first frame 42 is connected to the pair of first beams 41, and surrounds the mirror portion 2 and the pair of first beams 41 in the XY plane. The second frame 43 is connected to the first frame 42 and surrounds the mirror portion 2, the pair of first beams 41 and the first frame 42 in the XY plane. The pair of second beams 44 is connected to both sides of the second frame 43 in the Y-axis direction, and is extended in the Y-axis direction.

The first driving portions 3A and 3B are provided on both sides with respect to the first frame 42 in the Y-axis direction, respectively. Each of the first driving portions 3A and 3B includes a piezoelectric body, an upper electrode and a lower electrode provided above and below the piezoelectric body. The piezoelectric bodies of the first driving portions 3A and 3B are formed of piezoelectric zirconate titanate (PZT). The upper electrode and the lower electrode of the first driving portions 3A and 3B are formed of metal.

Figure 4:
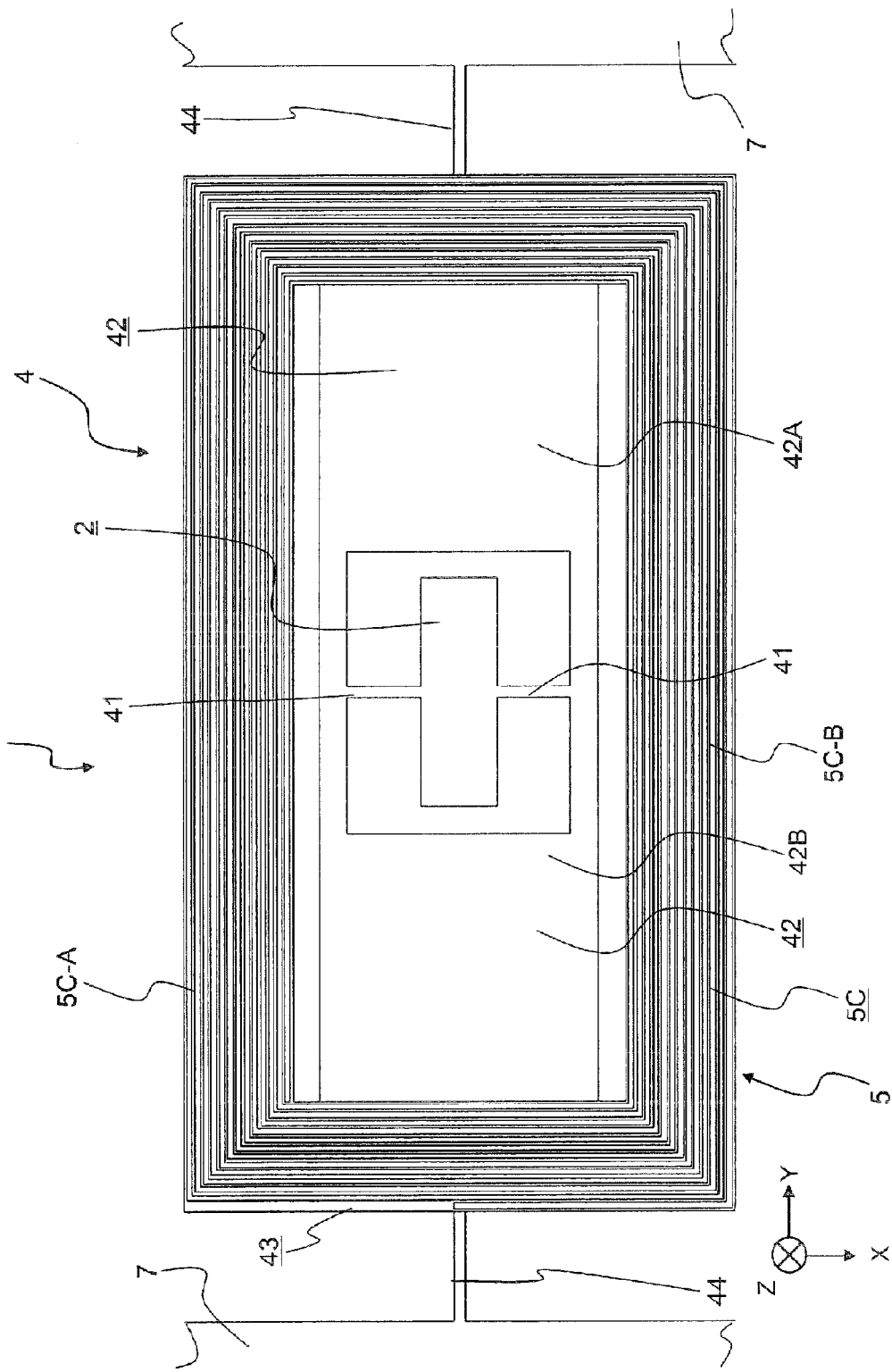
FIG. 4 is a bottom view of a movable portion 4 of the optical scanner 1.
Figure 5:
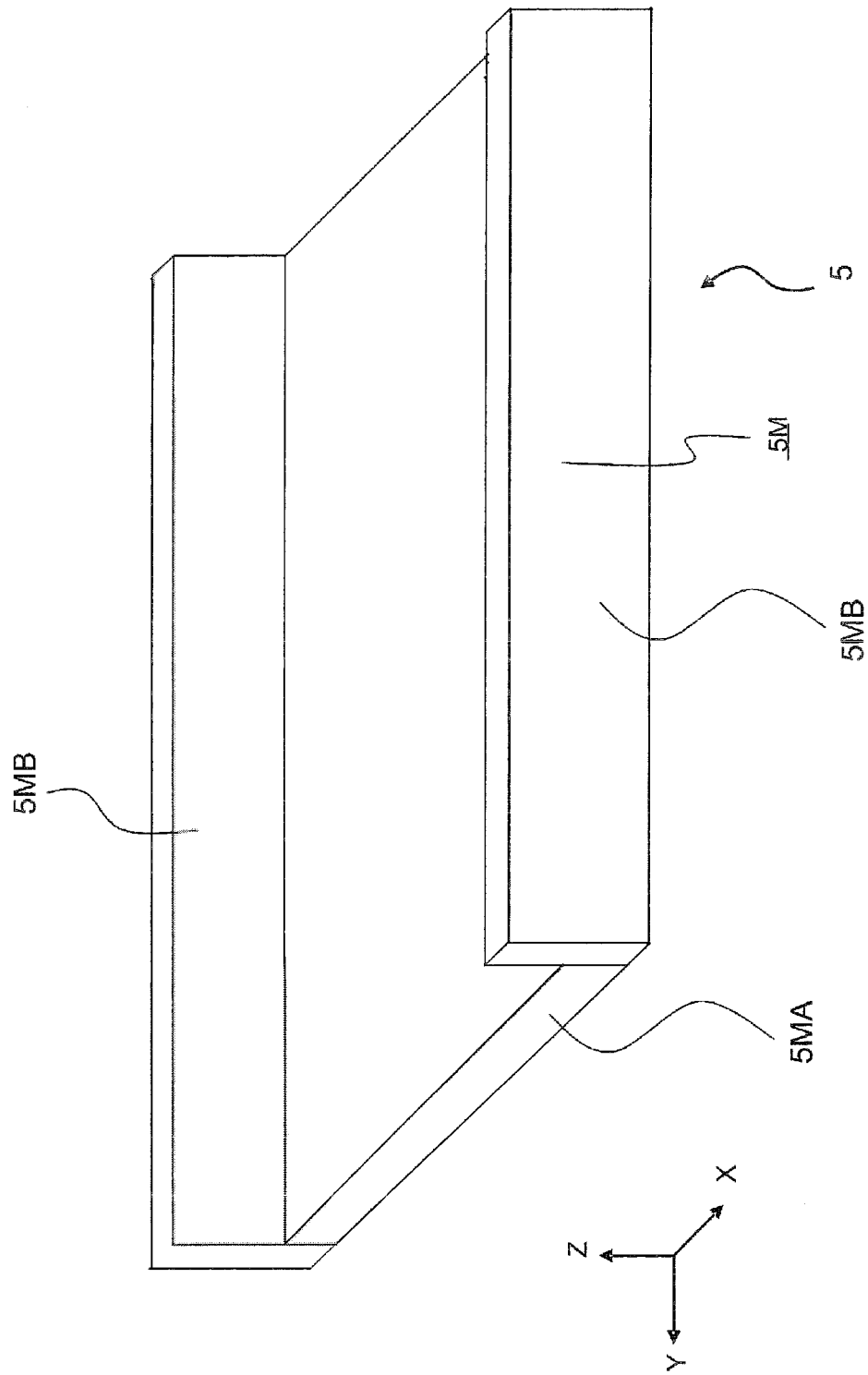
FIG. 5 is a perspective view illustrating an outer configuration of a generator 5M of the optical scanner 1.

The second driving portion 5 includes a coil 5C as shown in FIG. 3 and FIG. 4, and a generator 5M as shown in FIG. 5. As shown in FIG. 4, the coil 5C is provided along the second frame 43 on a lower surface of the second frame 43. As shown in FIG. 5, the generator 5M includes a permanent magnet 5MA and a pair of yokes 5MB. The generator 5M generates a magnetic field in the X-axis direction.

The base 6 has a recess portion 6A as shown in FIG. 1. The recess portion 6A has a shape recessed toward the negative direction of the Z-axis from the positive direction of the Z-axis. As shown in FIG. 1, the generator 5M is provided in the recess portion 6A. As shown in FIG. 1, the movable portion 4 is provided above the recess portion 6A.

As shown in FIG. 1, the installation portion 7 is connected to the second beams 44. The installation portion 7 is integrally formed with the movable portion 4. As shown in FIG. 1, the installation portion 7 is provided on the base 6 with adhesive.

[Electrical Configuration]

Figure 6:
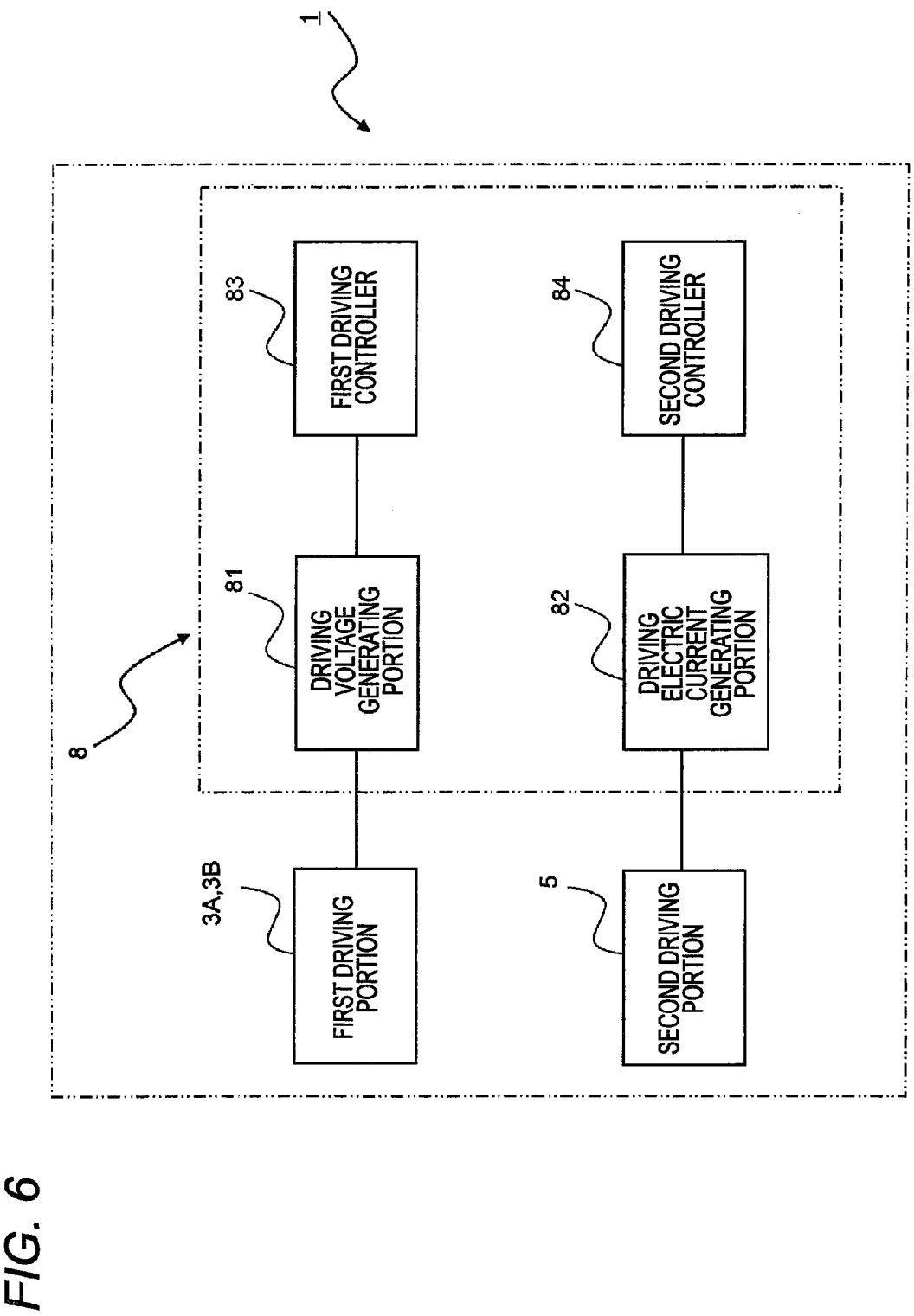
FIG. 6 is a diagram illustrating an electrical configuration of the optical scanner 1.

Hereinafter, an electrical configuration of the optical scanner 1 will be described with reference to FIG. 6. The optical scanner 1 includes a driving controller 8 shown in FIG. 6. The driving controller 8 includes a driving voltage generating portion 81, a driving electric current generating portion 82, a first driving controller 83, and a second driving controller 84. The driving voltage generating portion 81 generates an adjustable driving voltage, and is connected to the upper electrode and the lower electrode of each first driving portion 3A, 3B. The driving voltage generating portion 82 generates an adjustable driving electric current, and is connected to the coil 5C of the second driving portion 5. The first driving controller 83 is connected to the driving voltage generating portion 81. The first driving controller 83 controls the driving voltage generating portion 81 and causes the driving voltage generating portion 81 to generate a driving voltage.

The second driving controller 84 is connected to the driving electric current generating portion 82. The second driving controller 84 controls the driving electric current generating portion 82 and causes the driving electric current generating portion 82 to generate a driving electric current. The driving voltage generating portion 81 and the first driving controller 83 drive the first driving portions 3A and 3B in a piezoelectric driving method. The driving electric current generating portion 82 and the second driving controller 84 drive the second driving portion 5 in an electromagnetic driving method.

The driving voltage which is generated by the driving voltage generating portion 81 and is supplied to the first driving portions 3A and 3B is a driving signal which is periodically changed with time. The driving voltage generating portion 81 generates a driving signal having a resonant frequency of an entire system of the optical scanner 1, and supplies the driving signal to the first driving portions 3A and 3B. As the driving signal having the resonant frequency is supplied to the first driving portions 3A and 3B, the first driving portions 3A and 3B are driven in a resonant condition, and the mirror portion 2 can be oscillated with larger amplitude and at high speed. In other words, the driving controller 8 drives the first driving portions 3A and 3B in the resonant condition.

The driving electric current generating portion 81 generates a driving electric current for driving the second driving portion 5 in a non-resonant condition. Accordingly, the second driving portion 5 is driven in the non-resonant condition. In other words, the driving controller drives the second driving portion 5 in the non-resonant condition.

As the first driving portions 3A and 3B are driven in the resonant condition and the second driving portion 5 is driven in the non-resonant condition, compared with a case where the first driving portions 3A and 3B and the second driving portion 5 are all driven in the resonant condition, in a case where the optical scanner 1 is applied to an image display apparatus, it is possible to easily control the image display. It is noted that even though the second driving portion 5 does not reach the resonant condition, the optical scanner 1 can be driven.

[Operation]

An operation of the optical scanner 1 will be described with reference to FIG. 1 to FIG. 7.

The driving voltage generating portion 81 supplies a driving voltage with the upper electrode and the lower electrode of the first driving portion 3A, and also supplies a driving voltage with the upper electrode and the lower electrode of the first driving portion 3B. The driving voltage supplied to the upper electrode and the lower electrode of the first driving portion 3A has a reverse phase with respect to the phase of the driving voltage supplied to the upper electrode and the lower electrode of the first driving portion 3B. The driving voltage is periodically changed with time. Since the reverse phase driving voltage is supplied between the upper electrode and the lower electrode of the first driving portion 3A, and between the upper electrode and the lower electrode of the first driving portion 3B, the respective piezoelectric bodies of the first driving portions 3A and 3B are displaced in the same direction along the Y-axis. That is, when the piezoelectric body of the first driving portion 3A shrinks in a positive direction of the Y-axis, the piezoelectric body of the first driving portion 3B extends in the positive direction of the Y-axis, and when the piezoelectric body of the first driving portion 3A extends in a negative direction of the Y-axis, the piezoelectric body of the first driving portion 3B shrinks in the negative direction of the Y-axis. The first driving portions 3A and 3B are driven in the above piezoelectric driving method.

As the respective piezoelectric bodies of the first driving portions 3A and 3B are displaced in the same direction of the Y-axis, the first frame 42A on the positive direction side of the Y-axis and the first frame 42B on the negative direction side of the Y-axis are bent in opposite directions of the Z-axis. That is, when the first frame 42A is bent in the positive direction of the Z-axis, the first frame 42B is bent in the negative direction of the Z-axis, and when the first frame 42A is bent in the negative direction along the Z-axis, the first frame 42B is bent in the positive direction along the Z-axis. In this way, the first frames 42A and 42B are periodically bent, and thus, a standing waveform deformation having the axis AX1 as a node is generated in the first frame 42. The standing waveform deformation having the axis AX1 as the node generated in the first frame 42 induces torsional vibrations around the axis AX1 of the first beams 41. As a result, the mirror portion 2 is oscillated around the axis AX1. As the mirror portion 2 is oscillated, the reflective surface 21 of the mirror portion 2 is oscillated around the axis AX1.

Figure 7:
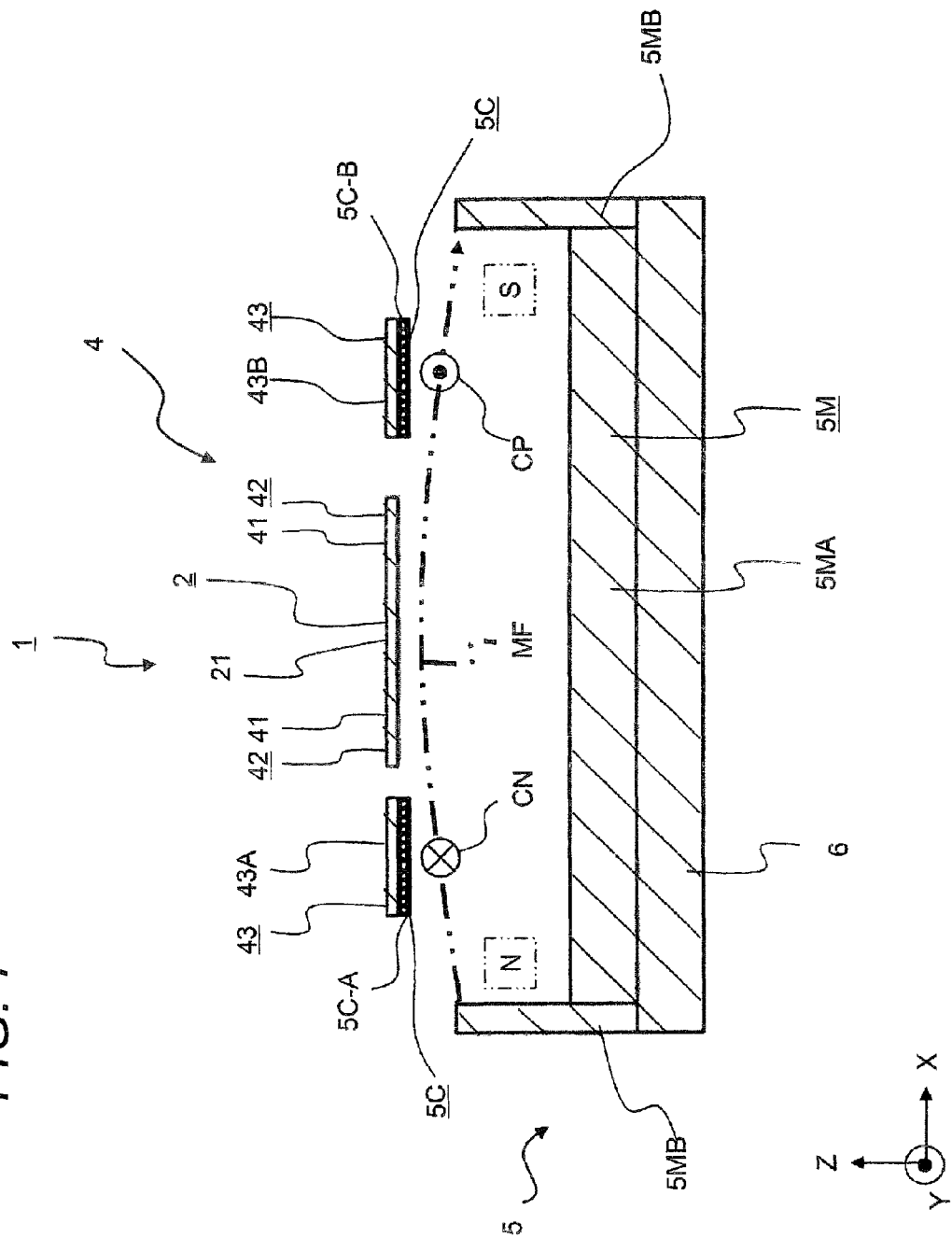
FIG. 7 is a diagram explaining an interaction between a magnetic field MF generated by the generator 5M and a driving electric current flowing in a coil 5C.

The driving electric current generating portion 82 supplies the driving electric current to the coil 5C of the second driving portion 5. The driving electric current supplied to the coil 5C flows in the coil 5C around the right side when the XY plane is seen from the positive direction of the Z-axis. As shown in FIG. 7, the generator 5M includes the permanent magnet 5MA having a north pole on the negative direction side of the X-axis and a south pole on the positive direction side of the X-axis; and the pair of yokes 5MB provided on both side of the permanent magnet 5MA in the X-axis direction. According to this configuration, the generator 5M of the second driving portion 5 generates a magnetic field MF in the positive direction of the X-axis, as indicated by a two dotted arrow line shown in FIG. 7. When the driving electric current flows in both sides 5C-A and 5C-B of the coil 5C parallel to the Y-axis, the driving electric current flowing in the sides 5C-A and 5C-B and the magnetic field MF generated by the generator 5M interact with each other, and a Lorentz force in the Z-axis direction is generated in electric charges flowing in the coil 5C. As the Lorentz force in the Z-axis direction is generated, the second frame 43 moves in the Z-axis direction. That is, when a driving electric current in the negative direction CN of the Y-axis shown in FIG. 7 flows in the side 5C-A, the side 43A in the negative direction of the X-axis of the second frame 43 moves in the negative direction of the Z-axis. Further, when the driving electric current of the positive direction CP of the Y-axis shown in FIG. 7 flows in the side 5C-B, the side 43B in the positive direction of the X-axis of the second frame 43 moves in the positive direction of the Z-axis. The second driving portion 5 is driven in the above electromagnetic driving method.

As the second frame 43 moves in the Z-axis direction, the movable portion 4 is oscillated around an axis AX2 shown in FIG. 1. The second beams 44 are torsionally vibrated around the axis AX2. In this way, as the movable portion 4 is oscillated around the axis AX2 while the mirror portion 2 is oscillated around the axis AX1, the optical scanner 1 reflects the beam of light incident to the reflective surface 21 of the mirror portion 2 to perform a two-dimensional scanning.

[Advantageous Effects of the First Illustrative Embodiment]

According to the optical scanner 1 of the first illustrative embodiment, the movable portion 4 having the first driving portions 3A and 3B which cause the mirror portion 2 to oscillate around the axis AX1 is oscillated around the axis AX2 by the second driving portion 5 driven in an electromagnetic driving method which is different from the piezoelectric driving method. Accordingly, the movement of the optical scanner 1 by the piezoelectric driving method used for the oscillation around the axis AX1 and the movement of the optical scanner 1 by the electromagnetic driving method used for the oscillation around the axis AX2 do not interfere with each other, and a high accuracy driving control of the optical scanner 1 can be performed.

Further, according to the optical scanner 1 of the first illustrative embodiment, the first driving portions 3A and 3B include the piezoelectric body. Further, the first driving portions 3A and 3B are driven in the piezoelectric driving method in which the driving signal is supplied to the piezoelectric body. Accordingly, compared with a driving method in which the first driving portions are driven by electromagnetic force or electrostatic force, the mirror portion 2 can be oscillated with large amplitude and at high speed.

Further, according to the optical scanner 1 of the first illustrative embodiment, the second driving portion 5 includes the coil 5C and the generator 5M which generates magnetic field. Additionally, the second driving portion 5 is driven in the electromagnetic driving method in which the driving electric current supplied to the coil 5C and the magnetic field generated by the generator 5M interact with each other. Accordingly, the movement of the optical scanner 1 by the piezoelectric driving method in which the first driving portions 3A and 3B are driven by supplying the driving signal to the piezoelectric body and the movement by the second driving portion 5 do not interfere with each other, and a high accuracy driving control of the optical scanner 1 can be performed.

Further, according to the optical scanner 1 of the first illustrative embodiment, the first driving portions 3A and 3B are driven in the resonant condition by the driving controller 8 which supplies the driving signal having the resonant frequency to the piezoelectric body. Accordingly, the mirror portion 2 can be oscillated with large amplitude and at high speed.

Further, according to the optical scanner 1 of the first illustrative embodiment, the second driving portion 5 is driven in the non-resonant condition by the driving controller 8. Even though the second driving portion 5 does not reach the resonant condition, the second driving portion 5 can cause the movable portion 4 to oscillate sufficiently, and the mirror portion 2 can be efficiently oscillated around the axis AX2. In a case where the first driving portions and the second driving portion are driven in the resonant condition, if the optical scanner is applied to the image display apparatus, since the oscillation waveforms around two axes of the mirror portion have a sine waveform, it is difficult to control the image display. Therefore, according to the optical scanner 1 of the first illustrative embodiment, compared with the case where the first driving portions and the second driving portion are driven in the resonant condition, the control of the image display when the optical scanner 1 is applied to the image display apparatus becomes easier.

Further, according to the optical scanner 1 of the first illustrative embodiment, the piezoelectric bodies of the first driving portions 3A and 3B are provided on the both sides in a direction perpendicular to the pair of first beams 41 of the first frame, and the coil of the second driving portion 5 is provided on the second frame 43. Additionally, in the optical scanner 1, while the pair of first beams 41 is torsionally vibrated and the mirror portion 2 is oscillated around the axis AX1 by the first driving portions 3A and 3B, the second beams 44 are vibrated and the movable portion 4 is oscillated around the axis AX2, by the second driving portion 5. And therefore, the two-dimensional scanning is performed to the beam of light incident to the mirror portion 2. Accordingly, the torsional vibration of the first beams 41 for contributing to the oscillation around the axis AX1 of the mirror portion 2 and the oscillation of the second beams 44 for contributing to the oscillation around the axis AX2 of the mirror portion 2 do not interfere with each other, and a high accuracy driving control of the optical scanner 1 can be performed.

Further, according to the scanner 1 of the first illustrative embodiment, the piezoelectric body is provided on the surface of the first frame 42 on one side in a direction perpendicular to the reflective surface 21, and the coil 5C is provided along the second frame 43 on the surface of the second frame 43 at the other side of the direction perpendicular to the reflective surface 21. Accordingly, compared with the case where the piezoelectric body and the coil are provided to the optical scanner on the same side in the direction perpendicular to the reflective surface, the movement of the optical scanner 1 by the piezoelectric driving method and the movement of the optical scanner 1 by the electromagnetic driving method less interfere with each other, and a high accuracy driving control of the optical scanner 1 can be performed. It is noted that the coil 5C may be provided along the second frame 43 inside the second frame 43 in addition to the surface of the second frame 43 on the other side of the direction perpendicular to the reflective surface 21. In this case, compared with the case where the piezoelectric body and the coil are provided in the optical scanner on the same side in the direction perpendicular to the reflective surface, the number of windings of the coil 5C can be increased, and therefore, the second driving portion 5 can be driven with large amplitude.

Further, according to the optical scanner 1 of the first illustrative embodiment, the installation portion 7 is provided on the base 6 so that the movable portion 4 is positioned above the recess portion 6A. Additionally, the generator 5M is provided on the recess portion 6A of the base 6, and the second driving portion 5 is driven by the Lorentz force generated by the driving electric current supplied to the sides 5C-A and 5C-B and the magnetic field in a direction parallel to the pair of first beams 41 generated by the generator 5M. Accordingly, the mirror portion 2 of the movable portion 4 is stably provided on the base 6, and a high accuracy driving control of the optical scanner 1 can be performed.

Second Illustrative Embodiment

A second illustrative embodiment of the present invention will be described with reference to the accompanying drawings.

Hereinafter, an outer configuration of an optical scanner 201 according to the second illustrative embodiment will be described with reference to FIG. 8 to FIG. 12.

Figure 8:
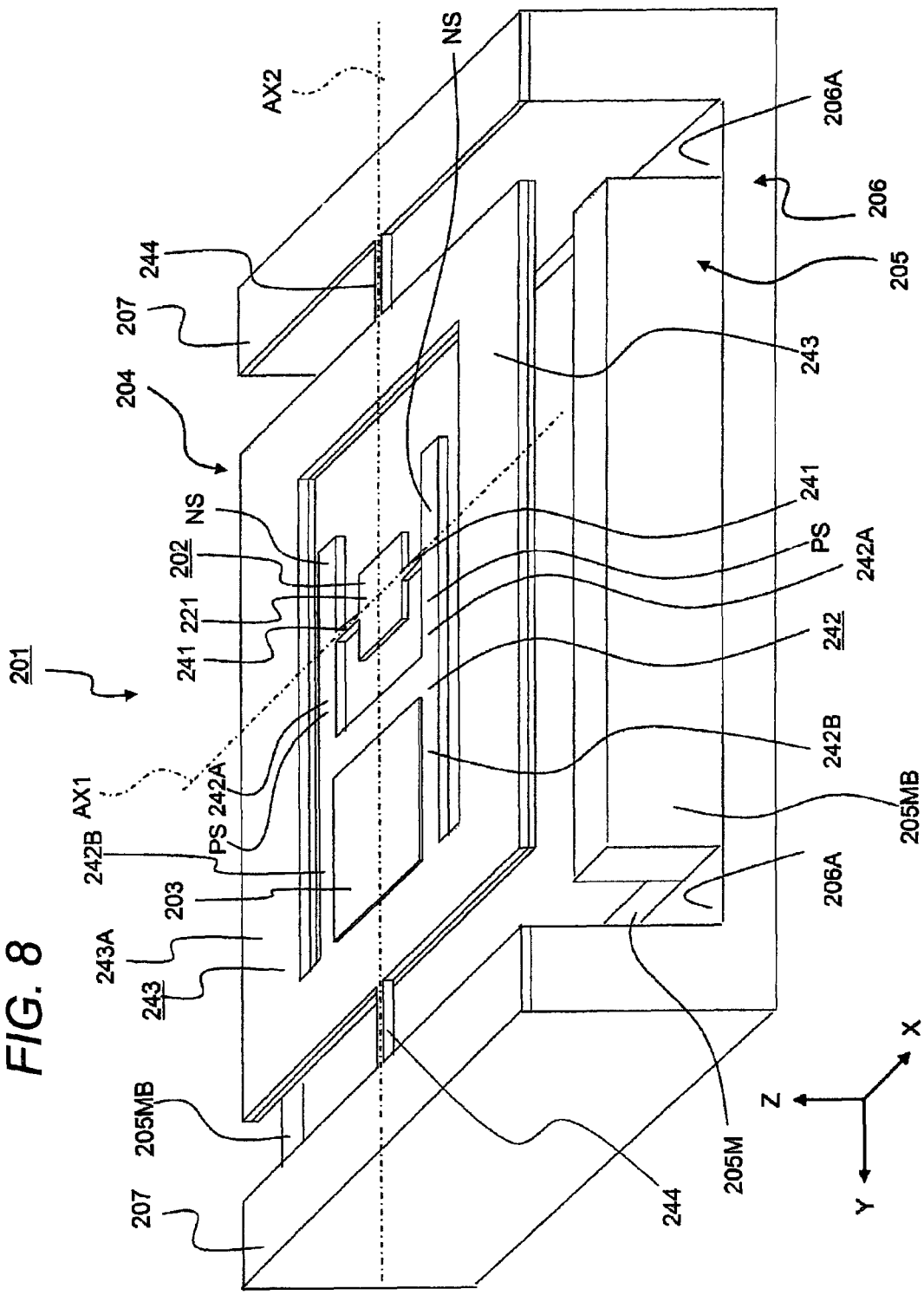
FIG. 8 is a perspective view illustrating an outer configuration of an optical scanner 201 according to a second illustrative embodiment of the present invention.
Figure 9:
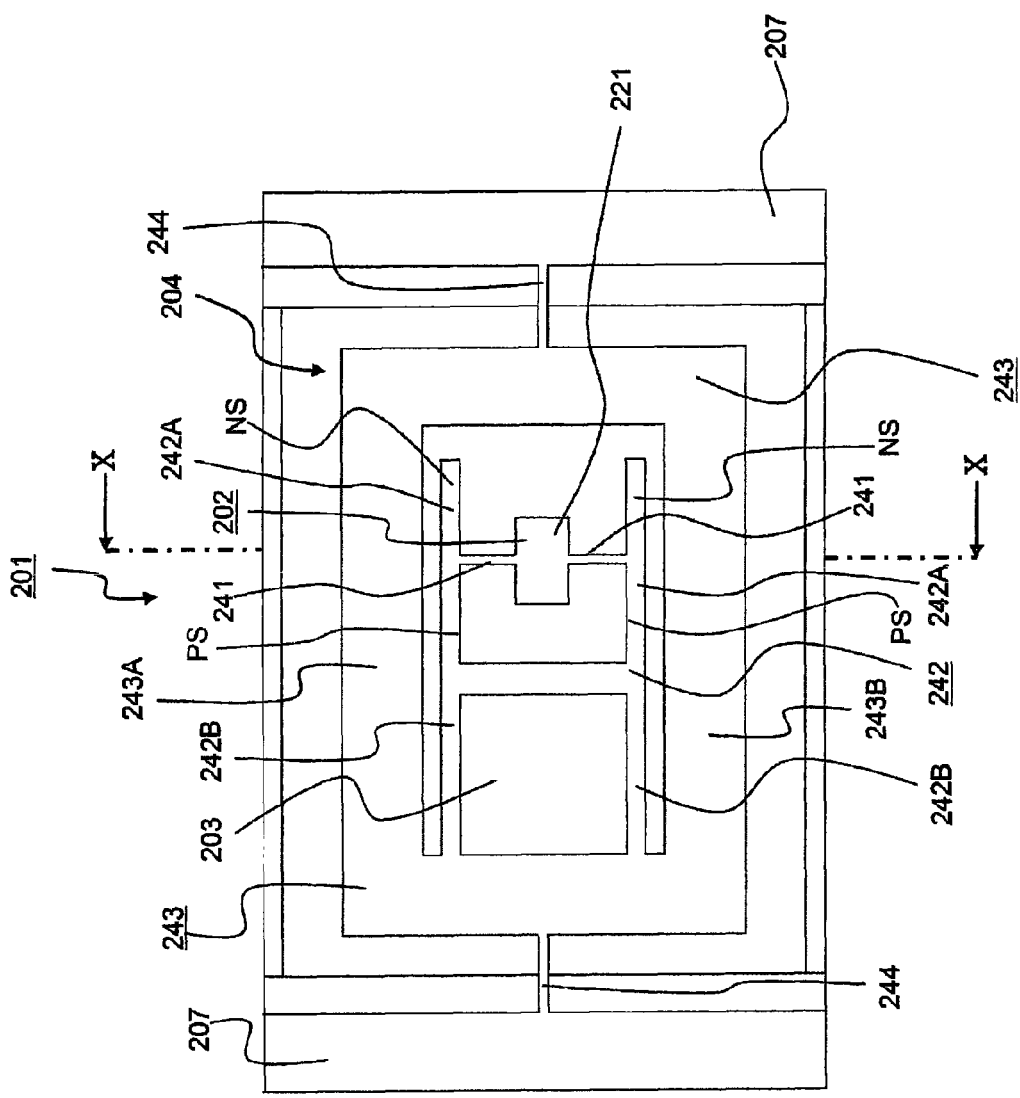
FIG. 9 is a top view of the optical scanner 201.
Figure 10:
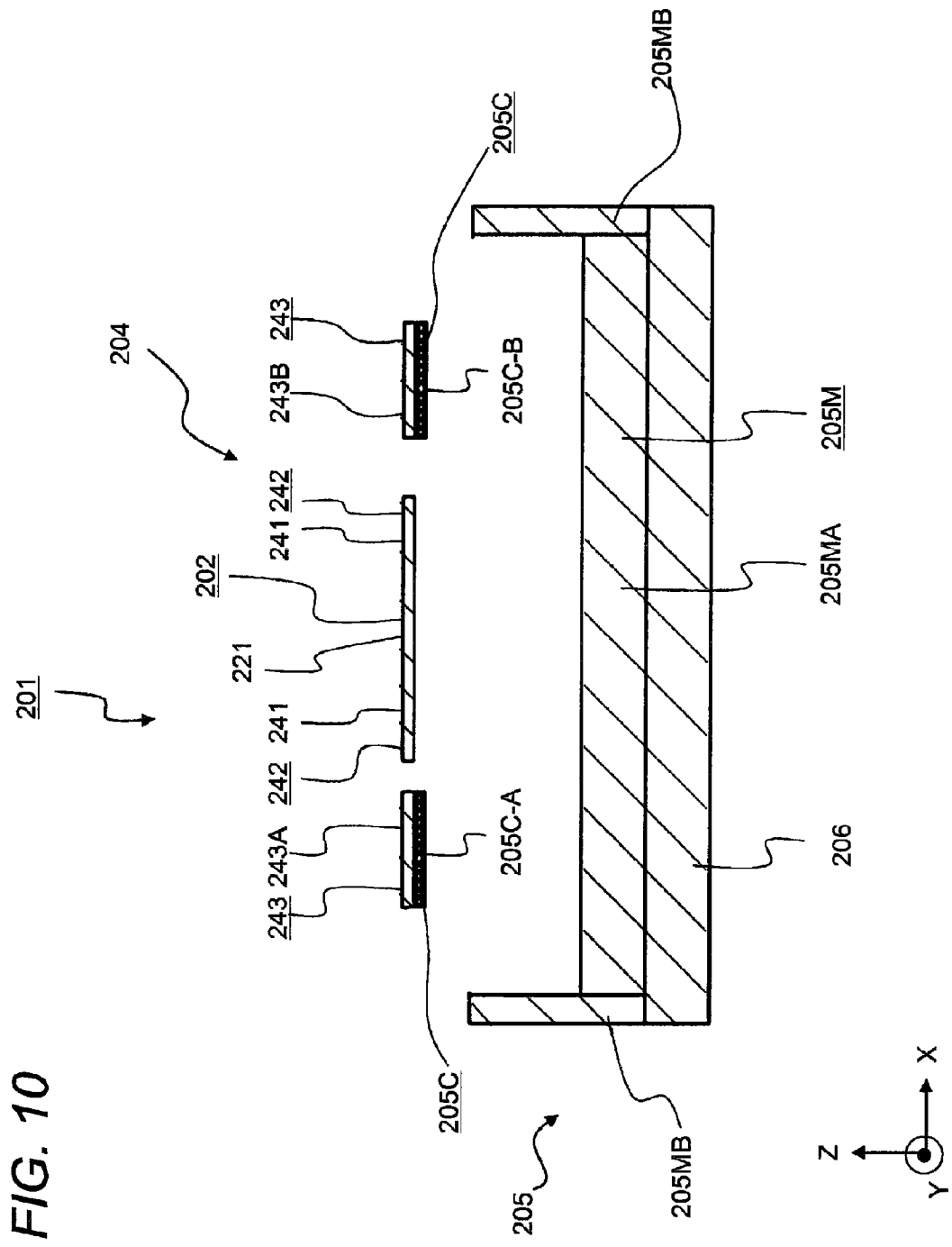
FIG. 10 is a sectional view taken along line X-X of the optical scanner 201 shown in FIG. 9.

As shown in FIG. 8 to FIG. 10, the optical scanner 210 includes a movable portion 204 including a mirror portion 202 and a first driving portion 203, a second driving portion 205, a base 206, and an installation portion 207. The line X-X shown in FIG. 9 approximately coincides with an axis AX1 shown in FIG. 8.

The mirror portion 202 includes a reflective surface 221, as shown in FIG. 8 to FIG. 10. The reflective surface 221 reflects an incident beam of light.

The movable portion 204 includes a pair of first beams 241, an extension plate 242, a second frame 243, and a pair of second beams 244. The movable portion 204 is formed of elastic materials. The pair of first beams 241, the extension plate 242, the second frame 243, and the pair of second beams 244 are integrally formed. The pair of first beams 241 extends from both sides of the mirror portion 202 on a surface parallel to the reflective surface 221. Hereinafter, as shown in FIG. 8, a direction parallel to the pair of first beams 241 is defined as the X-axis direction, a direction perpendicular to the pair of first beams 241 on the surface parallel to the reflective surface 221 is defined as the Y-axis direction, and a direction perpendicular to the reflective surface 221 is defined as the Z-axis direction. Accordingly, for example, the surface parallel to the reflective surface 221 is an XY plane. Hereinafter, a term "upper" indicates a positive direction of the Z-axis shown in FIG. 8, and a term "lower" indicates a negative direction of the Z-axis shown in FIG. 8. The definitions of the X-axis direction, the Y-axis direction and the Z-axis direction are common to the other drawings. The extension plate 242 includes a pair of first plates 242A and a second plate 242B. The pair of first plates 242A is respectively connected to the pair of first beams 241. The pair of first plates 242A respectively includes portions PS which extend in the positive direction of the Y-axis from connection portions of the pair of first beams 241 with the pair of first plates 242A; and portions NS which extend in the negative direction of the Y-axis from the connection portions. The second plate 242B is connected to the portions PS of the first plates 242A. The portions NS which extend in the negative direction of the Y-axis of the pair of first plates 242A have free ends which are not connected to other members. The second frame 243 is connected to the second plate 242B, and surrounds the mirror portion 202, the pair of first beams 241, the pair of first plates 242A, and the second plate 242B, in the XY plane. The pair of second beams 244 is connected to both sides of the second frame 243 in the Y-axis direction, and extends in the Y-axis direction.

The first driving portion 203 is provided on the second plate 242B. The first driving portion 203 includes a piezoelectric body provided on the second plate 242B, an upper electrode and a lower electrode provided above and below the piezoelectric body. The piezoelectric body of the first driving portion 203 is formed of piezoelectric zirconate titanate (PZT). The upper electrode of the first driving portion 203 is formed of metal.

Figure 11:
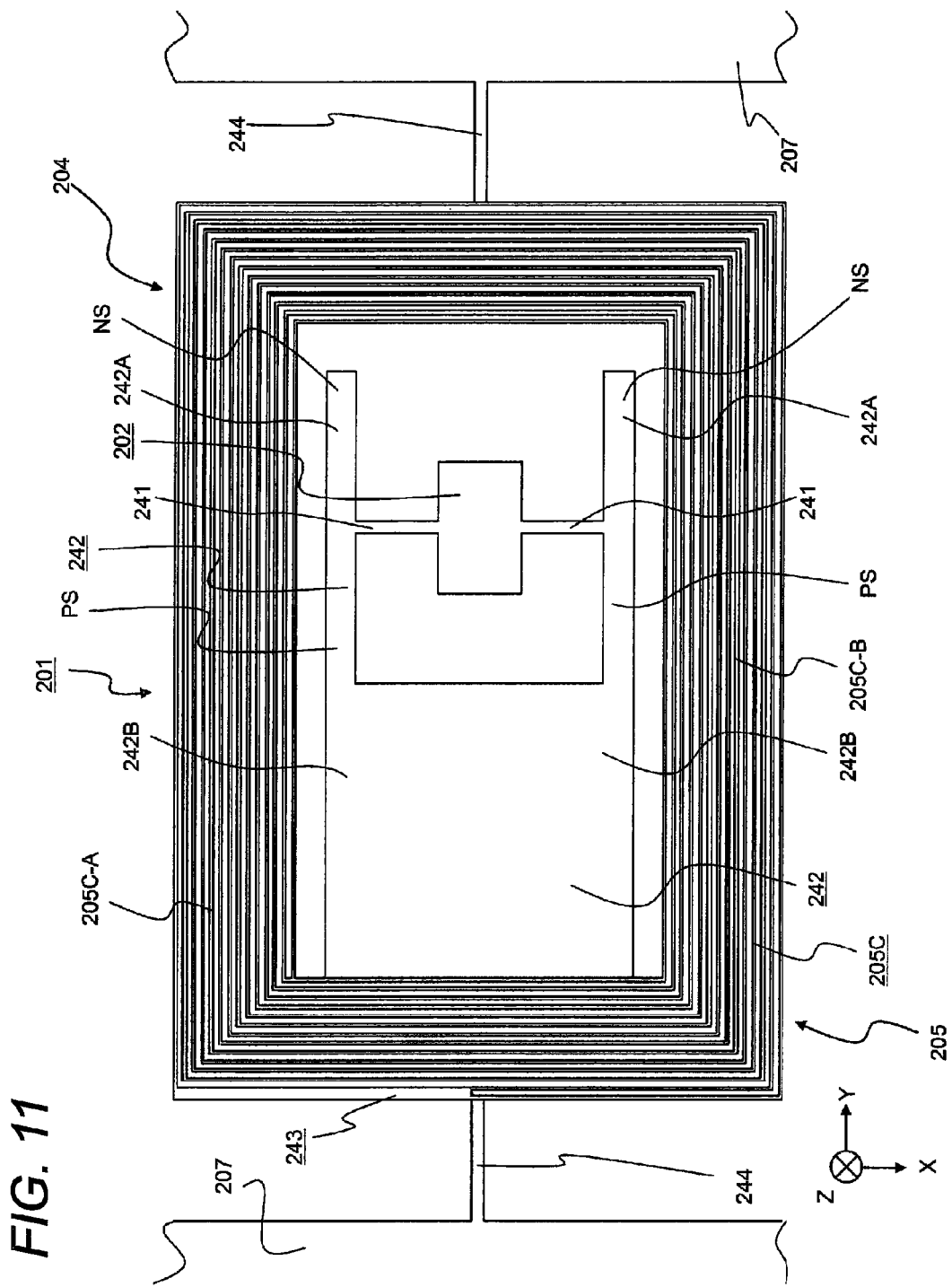
FIG. 11 is a bottom view of a movable portion 204 of the optical scanner 201.
Figure 12:
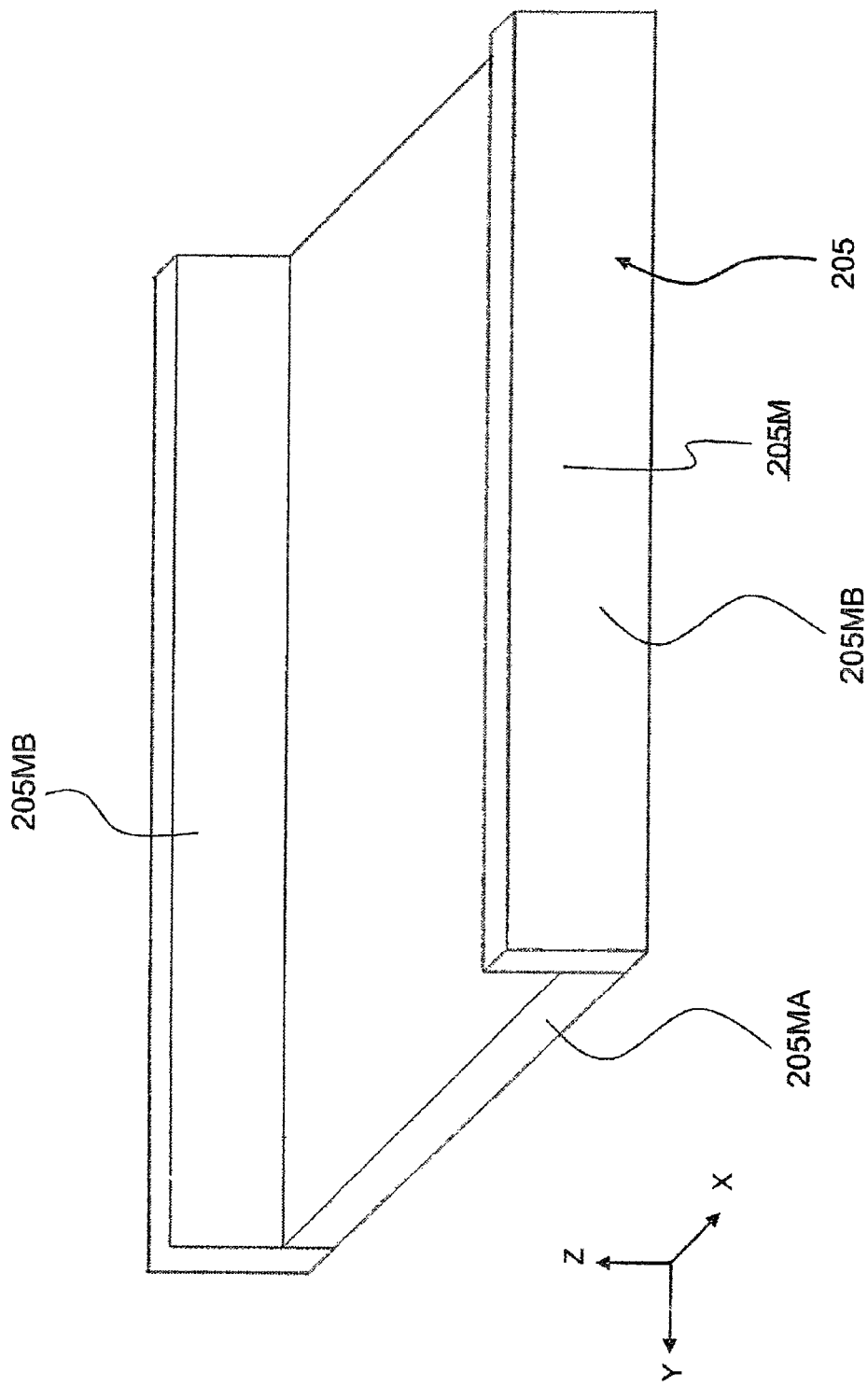
FIG. 12 is a perspective view illustrating an outer configuration of a generator 205M of the optical scanner 201.

The second driving portion 205 includes a coil 205C as shown in FIG. 10 and FIG. 11, and a generator 205M as shown in FIG. 12. As shown in FIG. 11, the coil 205C is provided along the second frame 243 on a lower surface of the second frame 243. As shown in FIG. 12, the generator 205M includes a permanent magnet 205MA and a pair of yokes 205MB. The generator 205M generates a magnetic field in the X-axis direction.

The base 206 has a recess portion 206A as shown in FIG. 8. The recess portion 206A has a shape recessed toward the negative direction of the Z-axis from the positive direction of the Z-axis. As shown in FIG. 11, the generator 205M is provided in the recess portion 206A. As shown in FIG. 8, the movable portion 204 is provided above the recess portion 206A.

As shown in FIG. 8, the installation portion 207 is connected to the second beams 244. The installation portion 207 is integrally formed with the movable portion 204. As shown in FIG. 8, the installation portion 207 is provided on the base 206 with adhesive.

Figure 13:
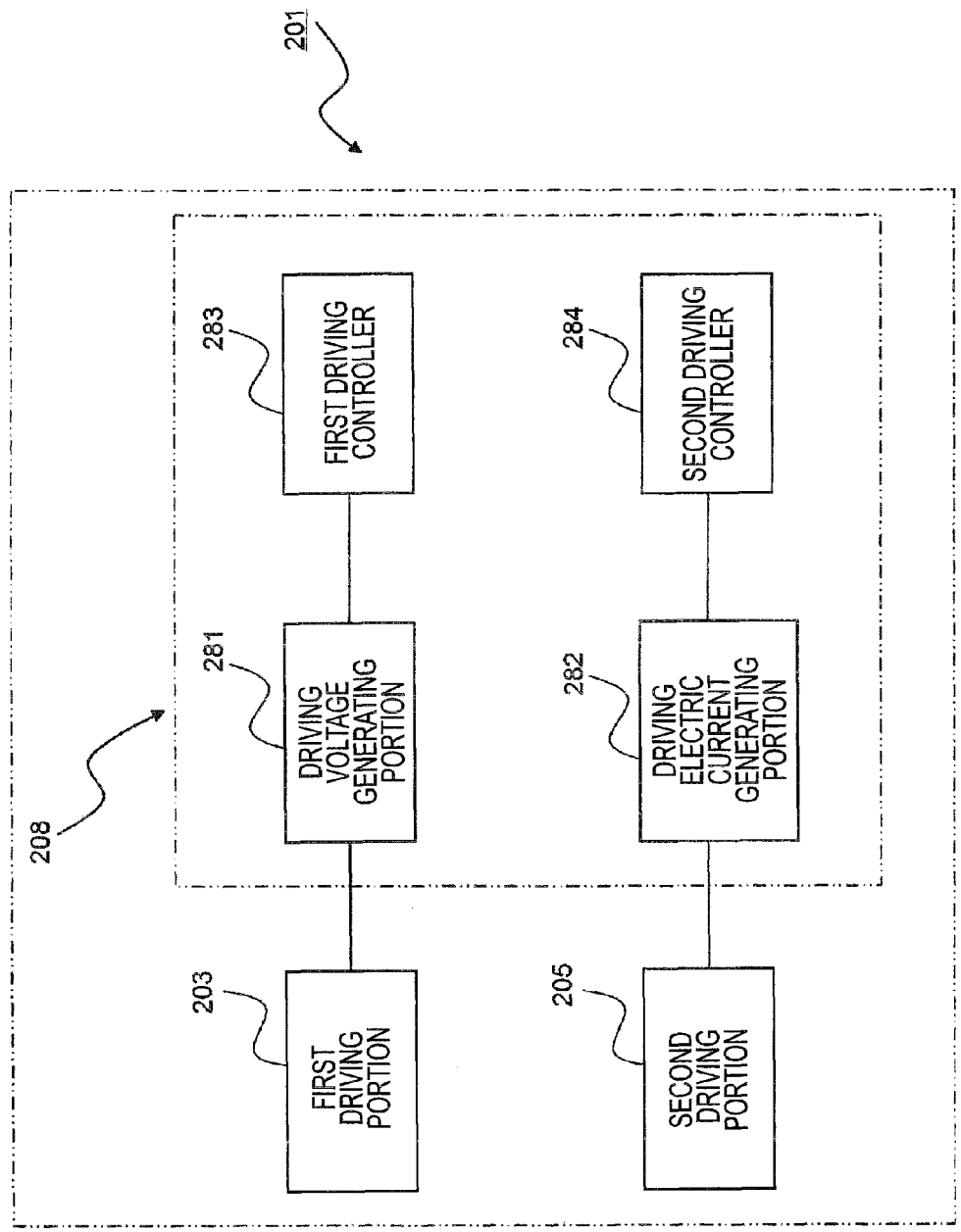
FIG. 13 is a diagram illustrating an electrical configuration of the optical scanner 201.

Hereinafter, an electrical configuration of the optical scanner 1 will be described with reference to FIG. 13. The optical scanner 201 includes a driving controller 208 shown in FIG. 13. The driving controller 208 includes a driving voltage generating portion 281, a driving electric current generating portion 282, a first driving controller 283, and a second driving controller 284. The driving voltage generating portion 281 generates an adjustable driving voltage, and is connected to the upper electrode and the lower electrode of the first driving portion 203. The driving voltage generating portion 282 generates an adjustable driving electric current, and is connected to the coil 205C of the second driving portion 205. The first driving controller 283 is connected to the driving voltage generating portion 281. The first driving controller 283 controls the driving voltage generating portion 281 and causes the driving voltage generating portion 281 to generate a driving voltage.

The second driving controller 284 is connected to the driving electric current generating portion 282. The second driving controller 284 controls the driving electric current generating portion 282 and causes the driving electric current generating portion 282 to generate a driving electric current. The driving voltage generating portion 281 and the first driving controller 283 drive the first driving portion 203 in a piezoelectric driving method. The driving electric current generating portion 282 and the second driving controller 284 drive the second driving portion 205 in an electromagnetic driving method.

The driving voltage which is generated by the driving voltage generating portion 281 and is supplied to the first driving portion 203 is a driving signal which is periodically changed with time. The driving voltage generating portion 281 generates a driving signal having a resonant frequency of an entire system of the optical scanner 201, and supplies the driving signal to the first driving portion 203. As the driving signal having the resonant frequency is supplied to the first driving portion 203, the first driving portion 203 is driven in a resonant condition, and the mirror portion 202 can be oscillated with larger amplitude and at high speed. In other words, the driving controller 208 drives the first driving portion 203 in the resonant condition.

The driving electric current generating portion 281 generates a driving electric current for driving the second driving portion 205 in a non-resonant condition. Accordingly, the second driving portion 205 is driven in the non-resonant condition. In other words, the driving controller 208 drives the second driving portion 205 in the non-resonant condition.

As the first driving portion 203 is driven in the resonant condition and the second driving portion 205 is driven in the non-resonant condition, compared with a case where the first driving portion 203 and the second driving portion 205 are driven in the resonant condition, in a case where the optical scanner 201 is applied to an image display apparatus, it is possible to easily control the image display. it is noted that even though the second driving portion 205 does not reach the resonant condition, the optical scanner 201 can be driven.

An operation of the optical scanner 201 will be described with reference to FIG. 8 to FIG. 14. The driving voltage generating portion 281 supplies a driving voltage between the upper electrode and the lower electrode of the first driving portion 203. The driving voltage is periodically changed with time. As the driving voltage is supplied between the upper electrode and the lower electrode of the first driving portion 203, the piezoelectric body of the first driving portion 203 is displaced in the Y-axis direction. The first driving portion 203 is driven in the above piezoelectric driving method. It is noted that the piezoelectric driving of the optical scanner 201 by means of the first driving portion 203 is explained in US2006/0245023, which is incorporated herein by reference.

As the piezoelectric body of the first driving portion 203 is displaced in the Y-axis direction, the second plate 242B is bent in the Z-axis direction. That is, when the piezoelectric body of the first driving portion 203 is displaced in the negative direction of the Y-axis, the second plate 242B is bent in the negative direction of the Z-axis. Further, when the piezoelectric body of the first driving portion 203 is displaced in the positive direction of the Y-axis, the second plate 242B is bent in the positive direction of the Z-axis. In this way, as the second plate 242B is periodically bent, a standing waveform deformation having the axis AX1 as a node is generated in the first plates 242A. The standing waveform deformation having the axis AX1 as the node generated in the first plates 242A induces torsional vibrations around the axis AX1 of the first beams 241. As a result, the mirror portion 202 is oscillated around the axis AX1. As the mirror portion 202 is oscillated, the reflective surface 221 of the mirror portion 202 is oscillated around the axis AX1.

Figure 14:
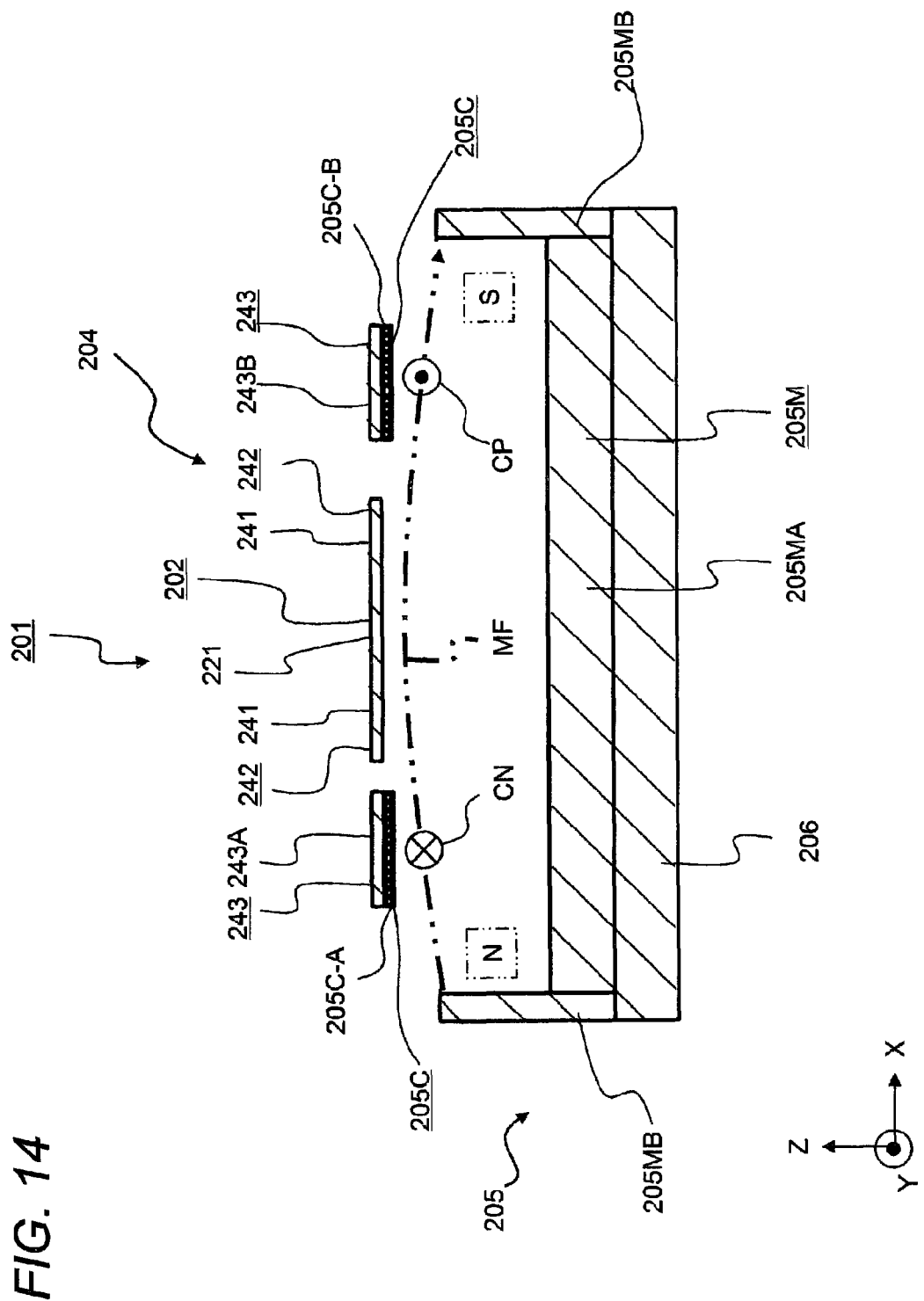
FIG. 14 is a diagram explaining an interaction between an electric field generated by the generator 205M and a driving electric current flowing in a coil 205C.

The driving electric current generating portion 282 supplies the driving electric current to the coil 205C of the second driving portion 205. The driving electric current supplied to the coil 205C flows in the coil 205C around the right side when the XY plane is seen from the positive direction of the Z-axis. As shown in FIG. 14, the generator 205M includes the permanent magnet 205MA having a north pole on the negative direction side of the X-axis and a south pole on the positive direction side of the X-axis; and the pair of yokes 205MB provided on both side of the permanent magnet 205MA in the X-axis direction. According to this configuration, the generator 205M of the second driving portion 205 generates a magnetic field MF in the positive direction of the X-axis, as indicated by a two dotted arrow line shown in FIG. 14. When the driving electric current flows in both sides 205C-A and 205C-B of the coil 205C parallel to the Y-axis, the driving electric current flowing in the pair of sides 205C-A and 205C-B and the magnetic field MF generated by the generator 205M interact with each other, and a Lorentz force in the Z-axis direction is generated in electric charges flowing in the coil 205C. As the Lorentz force in the Z-axis direction is generated, the second frame 243 moves in the Z-axis direction. That is, when a driving electric current in the negative direction CN of the Y-axis shown in FIG. 14 flows in the side 205C-A, the side 243A in the negative direction of the X-axis of the second frame 243 moves in the negative direction of the Z-axis. Further, when the driving electric current of the positive direction CP of the Y-axis shown in FIG. 14 flows in the side 205C-B, the side 243B in the positive direction of the X-axis of the second frame 243 moves in the positive direction of the Z-axis. The second driving portion 205 is driven in the above electromagnetic driving method.

As the second frame 243 moves in the Z-axis direction, the movable portion 204 is oscillate around an axis AX2 shown in FIG. 8. The second beams 244 are torsionally vibrated around the axis AX2. In this way, as the movable portion 204 is oscillated around the axis AX2 while the mirror portion 202 is oscillated around the axis AX1, the optical scanner 201 reflects the beam of light incident to the reflective surface 221 of the mirror portion 202 to perform a two-dimensional scanning.

[Advantageous Effects of the Present Illustrative Embodiment]

According to the optical scanner 201 of the second illustrative embodiment, the movable portion 204 having the first driving portion 203 which causes the mirror portion 202 to oscillate around the axis AX1 is oscillated around the axis AX2 by the second driving portion 205 driven in an electromagnetic driving method which is different from the piezoelectric driving method. Accordingly, the movement of the optical scanner 201 by the piezoelectric driving method used for the oscillation around the axis AX1 and the movement of the optical scanner 201 by the electromagnetic driving method used for the oscillation around the axis AX2 do not interfere with each other, and a high accuracy driving control of the optical scanner 201 can be performed.

Further, according to the optical scanner 201 of the second illustrative embodiment, the first driving portion 203 includes the piezoelectric body. Further, the first driving portion 203 is driven in the piezoelectric driving method in which the driving signal is supplied to the piezoelectric body. Accordingly, compared with a driving method in which the first driving portion 203 is driven by electromagnetic force or electrostatic force, the mirror portion 202 can be oscillated with large amplitude and at high speed.

Further, according to the optical scanner 201 of the second illustrative embodiment, the second driving portion 205 includes the coil 205C and the generator 205M which generates magnetic field. Further, the second driving portion 205 is driven in the electromagnetic driving method in which the driving electric current is supplied to the coil 205C and the driving electric current supplied to the coil 205C and the magnetic field generated by the generator 205M interact with each other. Accordingly, the movement of the optical scanner 201 by the piezoelectric driving method in which the first driving portion 203 is driven by supplying the driving signal to the piezoelectric body and the movement by the second driving portion 205 do not interfere with each other, and a high accuracy driving control of the optical scanner 201 can be performed.

Further, according to the optical scanner 201 of the second illustrative embodiment, the first driving portion 203 is driven in the resonant condition by the driving controller 208 which supplies the driving signal having the resonant frequency to the piezoelectric body. Accordingly, the mirror portion 202 can be oscillated with large amplitude and at high speed.

Further, according to the optical scanner 201 of the second illustrative embodiment, the second driving portion 205 is driven in the non-resonant condition by the driving controller 208. Even though the second driving portion 205 does not reach the resonant condition, the second driving portion 205 can cause the movable portion 204 to oscillate sufficiently, and the mirror portion 202 can be efficiently oscillated around the axis AX2. In a case where the first driving portion and the second driving portion are driven in the resonant condition, if the optical scanner is applied to the image display apparatus, since the oscillation waveforms around two axes of the mirror portion have a sine waveform, it is difficult to control the image display. Therefore, according to the optical scanner 201 of the second illustrative embodiment, compared with the case where the first driving portion and the second driving portion are driven in the resonant condition, the control of the image display when the optical scanner 201 is applied to the image display apparatus becomes easier.

Further, according to the optical scanner 201 of the second illustrative embodiment, the piezoelectric body of the first driving portion 203 is provided on the second plate 242B, and the coil of the second driving portion 205 is provided on the second frame 243. Additionally, in the optical scanner 201, while the pair of first beams 241 is torsionally vibrated and the mirror portion 202 is oscillated around the axis AX1 by the first driving portion 203, the second beams 244 are vibrated and the movable portion 204 is oscillated around the axis AX2 by the second driving portion 205. And therefore, the two-dimensional scanning is performed to the beam of light incident to the mirror portion 202. Accordingly, the torsional vibration of the first beams 241 for contributing to the oscillation around the axis AX1 of the mirror portion 202 and the oscillation of the second beams 244 for contributing to the oscillation around the axis AX2 of the mirror portion 202 do not interfere with each other, and a high accuracy driving control of the optical scanner 201 can be performed.

According to the scanner 201 of the second illustrative embodiment, the piezoelectric body is provided on the surface of the second plate 242B on one side of a direction perpendicular to the reflective surface 221, and the coil 205C is provided along the second frame 243 on the surface of the second frame 243 on the other side of the direction perpendicular to the reflective surface 221. Accordingly, compared with the case where the piezoelectric body and the coil are provided to the optical scanner on the same side in the direction perpendicular to the reflective surface, the movement of the optical scanner 201 in the piezoelectric driving method and the movement of the optical scanner 201 in the electromagnetic driving method do not interfere with each other, and a high accuracy driving control of the optical scanner 201 can be performed. It is noted that the coil 205C may be provided along the second frame 243 inside the second frame 243 in addition to the surface of the second frame 243 on the other side of the direction perpendicular to the reflective surface 221. In this case, compared with the case where the piezoelectric body and the coil are provided in the two-dimensional optical scanner on the same side in the direction perpendicular to the reflective surface, the number of windings of the coil 205C can be increased, and therefore, the second driving portion 205 can be driven with large amplitude.

Further, according to the optical scanner 201 of the second illustrative embodiment, the installation portion 207 is provided on the base 206 so that the movable portion 204 is positioned above the recess portion 206A. Additionally, the generator 205M is provided on the recess portion 206A of the base 206, and the second driving portion 205 is driven by the Lorentz force generated due to the driving electric current supplied to the sides 205C-A and 205C-B and the magnetic field in a direction parallel to the pair of first beams 241 generated by the generator 205M. Accordingly, the mirror portion 202 of the movable portion 204 is stably provided on the base 206, and a high accuracy driving control of the optical scanner 201 can be performed.

[Manufacturing Method]

A manufacturing method of the optical scanners 1 and 201 according to the first and second illustrative embodiments will be described. Hereinafter, the optical scanners 1 and 201 are simply referred to as an "optical scanner". Similarly, the other members, for example, the mirror portions 2 and 202 are simply referred to as a "mirror portion". The movable portion and the installation portion are integrally formed in the following manufacturing method, and hereinafter the movable portion and the installation portion are referred to as a "movable portion". Firstly, an elastic substrate is prepared as a material to be etched. Then, an etching process is performed for the material to be etched, so that the movable portion is formed. After the movable portion is formed, a resist film is formed on a region of the surface of the movable portion other than a portion on which the lower electrode is to be provided. After the resist film is formed, metal such as Pt or Au is deposited to the movable portion having a surface on which the resist film is formed. Through this process, the lower electrode made of the metal is stacked on the movable portion. After the lower electrode is stacked, the resist film is removed from the surface of the movable portion. Then, the piezoelectric body is provided on the lower electrode. In the providing process of the piezoelectric body, the resist film is formed on a region of the lower electrode other than the portion on which the piezoelectric body is provided, among the surface of the movable portion and the lower electrode. After the resist film is formed, aerosol of the PZT which is the piezoelectric material is sprayed onto the surface of the movable portion and the lower electrode on which the resist film is formed. Through this process, a piezoelectric film of the PZT is formed on the lower electrode, and thus the piezoelectric body is formed. After the piezoelectric body is formed, the resist film is removed from the surface of the movable portion and the lower electrode. After the providing process of the piezoelectric body is performed, the upper electrode is provided on the piezoelectric body. In the process of stacking the upper electrode, the metal deposition which is similar to the lower electrode stacking process as described above is used. After the upper electrode is stacked on the piezoelectric body, the reflective surface made of a metal film such as Al or Au is formed in a region of the substrate in which the mirror portion is formed. The above described metal deposition is used for the formation of the reflective surface. After the reflective surface is formed, the coil is adhered to a lower side of the movable portion with adhesive, a double-sided tape or the like. Here, a flexible printed circuit (FPC) having a winding pattern is separately manufactured in advance, and is adhered to the lower side of the moveable portion as the coil. After the coil is adhered, the movable portion is provided on the base having the generator. The optical scanner is manufactured through the above manufacturing method.

[Example of Applicant of Optical Scanner]

The optical scanners 1 and 201 according to the first and second illustrative embodiments can be applied to a laser printer, an image display apparatus such as a retinal scanning display (described later), or the like. In a case where the optical scanner 1 or 201 is applied to the above apparatuses, the optical scanner 1 or 201 is used as a deflection element for performing the two-dimensional scanning through an image light for forming an image. With the optical scanners 1 and 201 according to the first or second illustrative embodiment, a high accuracy scanning can be performed and a high quality image can be performed.

Figure 15:
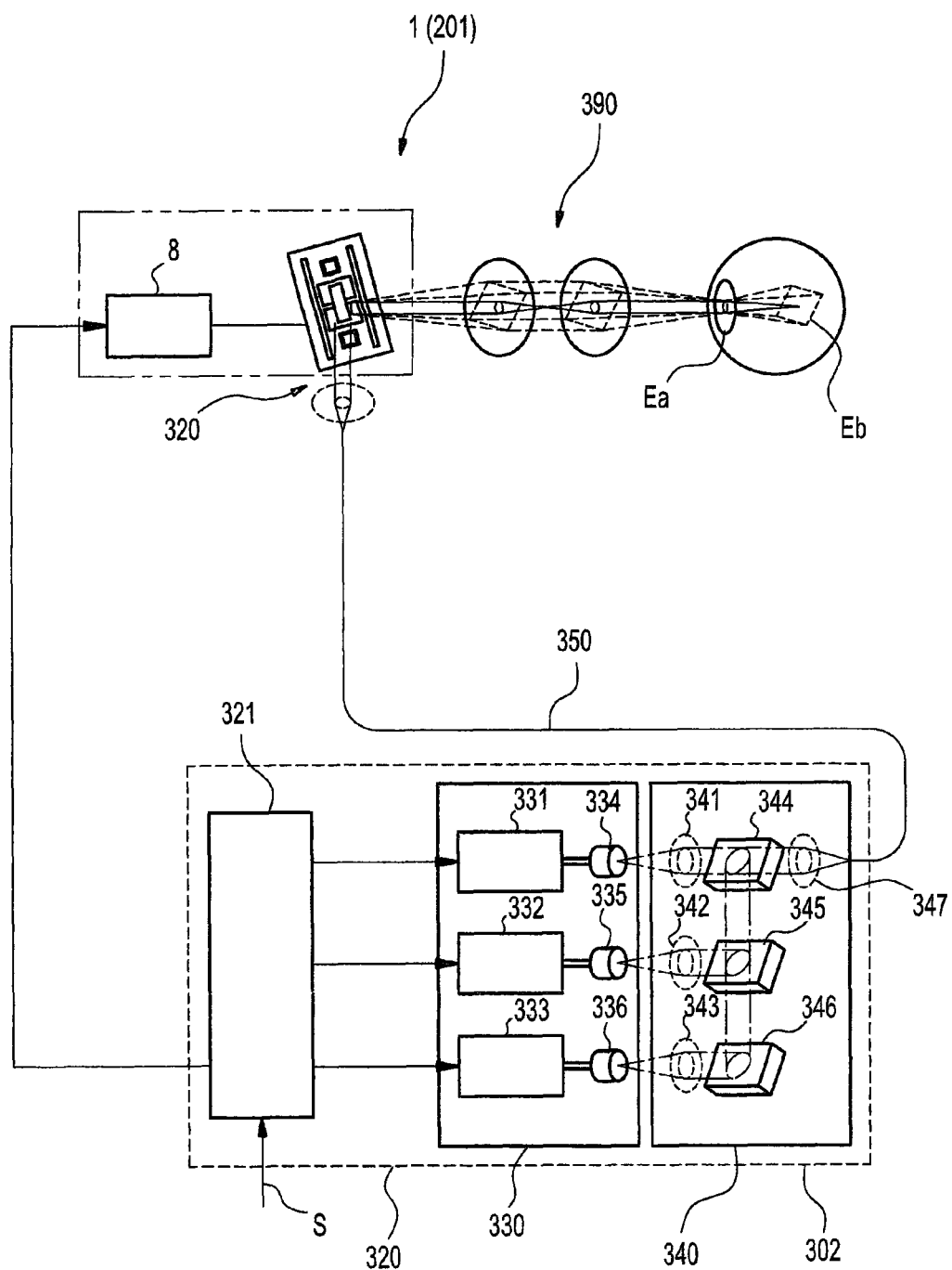
FIG. 15 is a schematic view showing a configuration of an image display apparatus 300.
Figure 16:
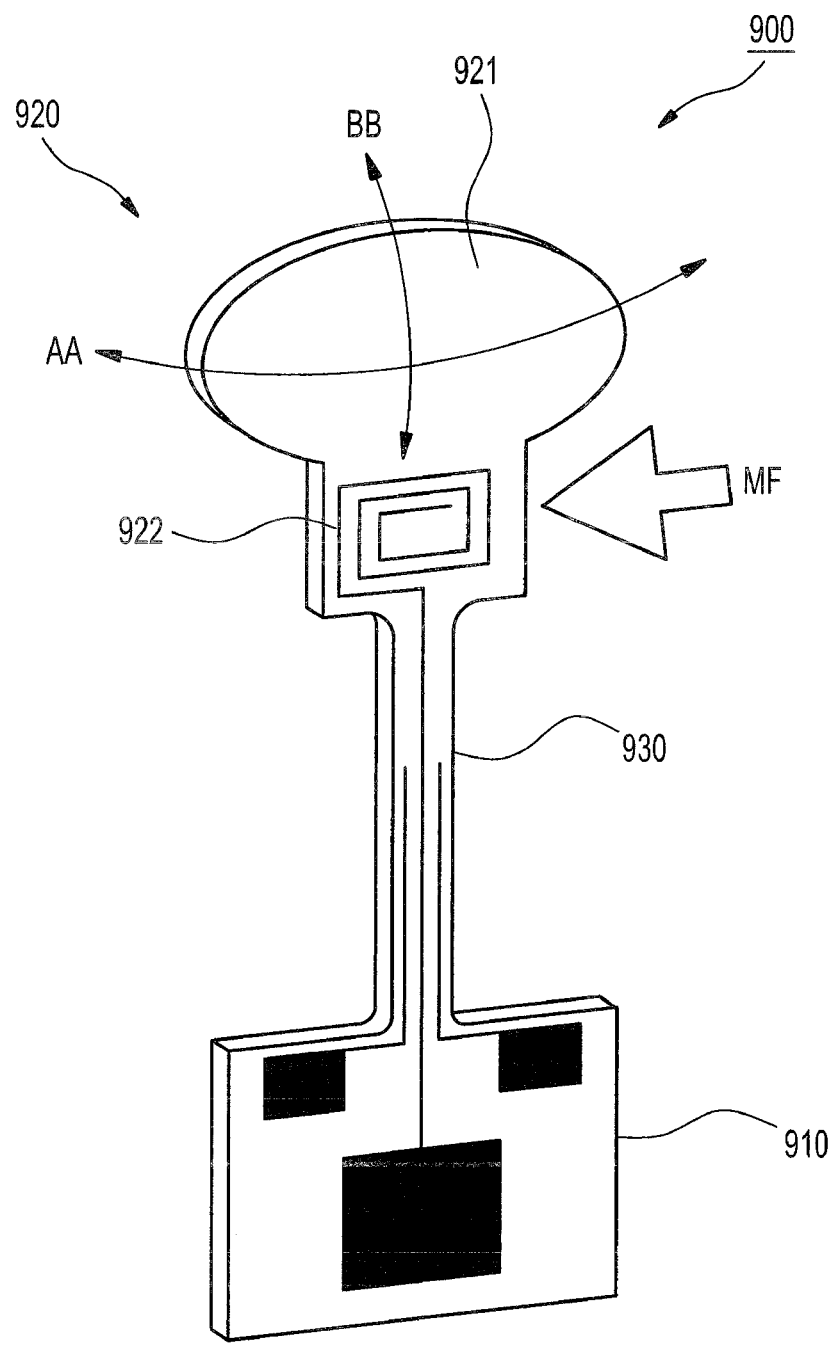
FIG. 16 is a perspective view illustrating a related-art optical scanner 900 disclosed in JP-UM-A-5-8525.

Hereinafter, an image display apparatus 300 including the optical scanner 1 or 201 will be described. The image display apparatus 300 shown in FIG. 15 is an apparatus that projects an image on a retina Eb of an observer with the light incident on a pupil Ea, thereby allowing the observer to see a virtual image. This apparatus is also called as a retinal scanning display.

The image display apparatus 300 includes a light generator 302, an optical fiber 350, a collimate optical system 320, the optical scanner 1 (201) according to the above-described illustrative embodiment. The light generator 302 includes an image signal processor 321, a laser light source 330 and an optical multiplexer 340. The image signal processor 321 generates a B signal, a G signal, an R signal, a control signal for the optical scanner 1, which are elements for composing images based on image signals supplied from the outside.

The laser light source 330 includes a B laser driver 331, a G laser driver 332, an R laser driver 333, a B laser 334, a G laser 335 and an R laser 336. The B laser driver 331 drives the B laser 334 so as to generate blue light having an intensity in accordance with a B signal from the image signal processor 321. The G laser driver 332 drives the G laser 335 so as to generate green light having an intensity in accordance with a G signal from the image signal processor 321. The R laser driver 333 drives the R laser 336 so as to generate red light having an intensity in accordance with an R signal from the image signal processor 321. The B laser 334, the G laser 335 and the R laser 336 may be configured by a semiconductor laser or a solid laser having harmonic producer.

The optical multiplexer 340 includes collimate optical systems 341, 342, 343 that collimate the laser light, dichroic mirrors 344, 345, 346 that multiplex the collimated laser light and a collecting optical system 347 that guides the multiplexed laser light to the optical fiber 350. The blue laser light emitted from the B laser 334 is collimated by the collimate optical system 341 and then incident onto the dichroic mirror 344. The green laser light emitted from the G laser 335 is collimated by the collimate optical system 342 and then incident onto the dichroic mirror 345. The red laser light emitted from the R laser 336 is collimated by the collimate optical system 343 and then incident onto the dichroic mirror 346. The laser lights of three primary colors, which are respectively incident onto the dichroic mirrors 344, 345, 346 are reflected or transmitted in a wavelength selection manner and multiplexed into light that is then incident onto the collecting optical system 347. The multiplexed laser light is collected by the collecting optical system 347 and then incident to the optical fiber 350.

The optical scanner 1 is driven in accordance with the control signal from the image signal processor 321. The laser light is two-dimensionally scanned and then allowed to be projected as an image by the scanning of the optical scanner 1. Specifically, the laser light emitted from the optical fiber 350 is collimated by the collimate optical system 320 and then guided to the mirror portion 2 of the optical scanner 1. The laser light that is scanned by the optical scanner 1 passes though a relay optical system 390 and is then incident on the pupil Ea of the observer as parallel light. Since the optical scanner 1 of the above-described illustrative embodiment is used in the image display apparatus 300, it is possible to perform a high precision scanning and to form a high quality image.

Modified Illustrative Embodiments

In the first and second illustrative embodiments, the first driving portions 3A, 3B and 203 include the piezoelectric body, the upper electrode and the lower electrode provided above and below the piezoelectric body. However, the present invention is not limited thereto. For example, the first driving portions may include the piezoelectric body and the upper electrode provided above the piezoelectric body. In this case, a member or the like corresponding to the movable portion 4 in the first illustrative embodiment or the second plate 242B in the second illustrative embodiment is formed of metal such as stainless steel, and is used as the lower electrode.

In the first and second illustrative embodiments, the optical scanner 1 or 201 includes a so-called moving coil configuration in which the coil 5C or 205C is provided on the rear side of the movable portion 4 or 204 and the second driving portion 5 or 205 is driven by the interaction between the magnetic field MF generated by the generator 5M or 205M and the driving electric current flowing in the coil 5C or 205C. However, the present invention is not limited thereto. For example, a so-called moving magnet configuration may be adopted in which a magnet is provided on a rear side of the movable portion and a generator including a coil is provided below the movable portion, and the second driving portion is driven by an attractive force or repulsive force acting between the magnetic field generated by the electric current flowing in the coil of the generator and the magnet provided on the rear side of the movable portion. However, since the magnet is generally heavier than the coil, the moving cull configuration in which the coil 5C or 205C is provided on the rear side of the movable portion 4 or 204, as shown in the first and second illustrative embodiments, is more advantageous than the moving magnet configuration in which the magnet is provided on the rear side of the movable portion, so that the movable portion 4 or 204 can be oscillated with large amplitude and at high speed.

In the first and second illustrative embodiments, the pair of second beams 44 or 244 is integrally formed with the second frames 43 or 243, respectively. However, the present invention is not limited thereto. The pair of second beams may be separately formed from the second frame. In this case, for example, the second frame includes two insert openings into which the pair of second beams inserts in the Y-axis direction parallel to the oscillation axis of the movable portion. In this case, the movable portion is oscillated around the pair of second beams with the pair of second beams as the oscillation axis.

In the first and second illustrative embodiments, the pair of second beams 44 or 244 is integrally formed with the installation portion 7 or 207, respectively. However, the present invention is not limited thereto. The pair of second beams may be separately formed from the installation portion, respectively. In this case, for example, the installation portion includes two insert openings into which the pair of second beams inserts in the Y-axis direction parallel to the oscillation axis of the movable portion. The movable portion is oscillated around the axis parallel to the pair of second beams together with the pair of second beams. In this way, in a case where the pair of second beams is respectively separated from the installation portion, it is advantageous in that a ringing phenomenon is not generated compared with the case where the pair of second beams is integrally formed with the installation portion. However, since the pair of second beams is separated from the installation portion, respectively, it may cause a problem that it is difficult to control the movement of the movable portion. Thus, in the optical scanners in the first and second illustrative embodiments, the pair of second beams is integrally formed with the installation portion, respectively, and therefore, it is easy to control the movement of the optical scanner, compared with the case where the pair of second beams is separated from the installation portion, respectively.

In the first and second illustrative embodiments, the etching process is used for forming the movable portion, but the present invention is not limited thereto. For example, press work or electro-discharge machining may be used. Further, the aerosol deposition method is used for the stacking process of the piezoelectric body, but the present invention is not limited thereto. As the providing process of the piezoelectric body, a vacuum deposition method, a physical vapor-phase growth method or a chemical vapor-phase growth method or the like may be used. Further, instead of the piezoelectric body stacked by the aerosol deposition method or the like, a bulk piezoelectric element may be used for the piezoelectric body. Further, the vacuum deposition method is used for stacking the upper electrode and the lower electrode, but the present invention is not limited thereto. For example, the physical vapor-phase growth method or the chemical vapor-phase growth method or the like may be used.

In the first and second illustrative embodiments, the FPC having the winding pattern is adhered to the lower side of the movable portion as the coil. However, the present invention is not limited thereto. The coil may be formed on the lower side of the movable portion using the known photolithography or the like. That is, for example, the resist may be provided on the lower side of the movable portion to form the coil pattern, and then the coil may be formed on the lower side of the movable portion by deposition or the like.

In the first and second illustrative embodiments, the installation portion 7 or 207 is provided on the base 6 or 206, and the base 6 or 206 has the recess portions 6A or 206A. Further, the generator 5A or 205A is provided in the recess portion 6A or 206A. However, the present invention is not limited thereto. For example, the base may be provided as a pair of rectangular parallelepiped bases, the installation portion may be provided on the pair of rectangular parallelepiped bases, and the generator may be separately provided between the pair of rectangular parallelepiped bases in the apparatus in which the optical scanner is provided.

What is claimed is:

1. A two-dimensional optical scanner comprising:
    a movable portion including:
        a mirror portion configured to reflect a beam of light incident to the minor portion; and
        a first driving portion configured to oscillate the mirror portion around a first axis, the first driving portion comprising a piezoelectric body;
    a second driving portion configured to oscillate the movable portion around a second axis perpendicular to the first axis, the second driving portion includes:
        a coil configured to be supplied with a driving electric current, and
        a generator configured to generate a magnetic field; and
    a driving controller configured to drive the first driving portion in a first driving method in which a driving signal is supplied to the piezoelectric body in a resonant condition, and configured to drive the second driving portion in a second driving method in which the driving electric current is supplied to the coil such that the driving electric current supplied to the coil and the magnetic field generated by the generator interact with each other in a non-resonant condition,
    wherein while the first driving portion oscillates the mirror portion around the first axis, the second driving portion oscillates the movable portion around the second axis, so that the minor portion reflects a beam of light incident to the mirror portion such that the two-dimensional optical scanner performs a two-dimensional scanning.

2. The two-dimensional optical scanner according to claim 1,
wherein the mirror portion includes a reflective surface configured to reflect the beam of light incident to the mirror portion,
wherein the movable portion includes:
   a pair of first beams connected to the mirror portion and extends from both sides of the mirror portion on a parallel surface to the reflective surface of the mirror portion;
   a pair of first plates connected to the pair of first beams, respectively, and each extends over both sides of the pair of first beams in a direction perpendicular to the pair of first beams, on the parallel surface;
   a second plate connected to the pair of first plates on one side thereof in the direction perpendicular to the pair of first beams, on the parallel surface;
   a second frame connected to the second plate and which surrounds the minor portion, the pair of first beams, the pair of first plates and the second plate on the parallel surface; and
   a pair of second beams connected to both sides of the second frame in the direction perpendicular to the pair of first beams and which extends in the direction perpendicular to the pair of first beams on the parallel surface,
wherein the piezoelectric body is provided on the second plate,
wherein the coil is provided on the second frame, and
wherein while the first driving portion torsionally vibrates the pair of first beams such that the first driving portion oscillates the mirror portion around the first axis, the second driving portion vibrates the pair of second beams such that the second driving portion oscillates the movable portion around the second axis.

3. The two-dimensional optical scanner according to claim 2,
wherein the piezoelectric body is provided on one side of the second plate in a perpendicular direction to the reflective surface of the mirror portion, and
wherein the coil is provided along the second frame on the other side of the second frame in the perpendicular direction.

4. The two-dimensional optical scanner according to claim 2, further comprising:
a base having a recess portion in which the generator is provided; and
an installation portion connected to the pair of second beams and is provided on the base,
wherein the movable portion is provided above the recess portion,
wherein the generator is configured to generate the magnetic field in a direction parallel to the pair of first beams, and
wherein the second driving portion is driven by a Lorentz force generated by the driving electric current supplied to a side of the coil perpendicular to the pair of first beams and the magnetic field generated by the generator in the direction parallel to the pair of first beams.

5. An image display apparatus comprising:
the optical scanner according to claim 1;
a light source configured to emit a beam of light to the optical scanner; and an optical system configured to guide a beam of light scanned by the optical scanner to an eye of a user.

6. A two-dimensional optical scanner, comprising:
a movable portion including:
   a mirror portion configured to reflect a beam of light incident to the minor portion; and
   a first driving portion configured to oscillate the minor portion around a first axis, the first driving portion comprising a piezoelectric body;
a second driving portion configured to oscillate the movable portion around a second axis perpendicular to the first axis, the second driving portion includes:
   a coil configured to be supplied with a driving electric current, and
   a generator configured to generate a magnetic field; and
a driving controller configured to drive the first driving portion in a first driving method in which a driving signal is supplied to the piezoelectric body, and configured to drive the second driving portion in a second driving method in which the driving electric current is supplied to the coil such that the driving electric current supplied to the coil and the magnetic field generated by the generator interact with each other,
wherein while the first driving portion oscillates the mirror portion around the first axis, the second driving portion oscillates the movable portion around the second axis, so that the minor portion reflects a beam of light incident to the mirror portion such that the two-dimensional optical scanner performs a two-dimensional scanning,
wherein the mirror portion includes a reflective surface configured to reflect the beam of light incident to the mirror portion,
wherein the movable portion includes:
   a pair of first beams connected to the mirror portion and extends from both sides of the minor portion on a parallel surface to the reflective surface of the mirror portion;
   a first frame connected to the pair of first beams and which surrounds the minor portion and the pair of first beams on the parallel surface;
   a second frame connected to the first frame and which surrounds the minor portion, the pair of first beams and the first frame on the parallel surface; and
   a pair of second beams connected to both sides of the second frame in a direction perpendicular to the pair of first beams and extends in the direction perpendicular to the pair of first beams on the parallel surface,
wherein the piezoelectric body is provided on both sides of the first frame with respect to the mirror portion in the direction perpendicular to the pair of first beams,
wherein the coil is provided on the second frame, and
wherein while the first driving portion torsionally vibrates the pair of first beams such that the first driving portion oscillates the mirror portion around the first axis, the second driving portion vibrates the pair of second beams such that the second driving portion oscillates the movable portion around the second axis.

7. The two-dimensional optical scanner according to claim 6,
wherein the piezoelectric body is provided on one side of the first frame in a perpendicular direction to the reflective surface of the mirror portion, and
wherein the coil is provided along the second frame on the other side of the second frame in the perpendicular direction.

8. The two-dimensional optical scanner according to claim 6, further comprising:
a base having a recess portion in which the generator is provided; and
an installation portion connected to the pair of second beams and is provided on the base,
wherein the movable portion is provided above the recess portion,
wherein the generator is configured to generate the magnetic field in a direction parallel to the pair of first beams, and
wherein the second driving portion is driven by a Lorentz force generated by the driving electric current supplied to a side of the coil perpendicular to the pair of first beams and the magnetic field generated by the generator in the direction parallel to the pair of first beams.

9. The two-dimensional optical scanner according to claim 6, wherein the driving controller drives the first driving portion in a resonant condition.

10. The two-dimensional optical scanner according to claim 9, wherein the driving controller drives the second driving portion in a non-resonant condition.

11. An image display apparatus comprising:
the optical scanner according to claim 6;
a light source which is configured to emit a beam of light to the optical scanner; and
an optical system which is configured to guide a beam of light scanned by the optical scanner to an eye of a user.

12. A two-dimensional optical scanner comprising:
a movable portion including:
a mirror portion configured to reflect a beam of light incident to the minor portion, and
a first driving portion configured to oscillate the minor portion around a first axis, the first driving portion comprising a piezoelectric body;
a second driving portion configured to oscillate the movable portion around a second axis perpendicular to the first axis, the second driving portion comprising:
a coil configured to be supplied with a driving electric current, and
a generator configured to generate a magnetic field; and
a driving controller configured to drive the first driving portion in a first driving method in which a driving signal is supplied to the piezoelectric body, and configured to drive the second driving portion in a second driving method in which the driving electric current is supplied to the coil such that the driving electric current supplied to the coil and the magnetic field generated by the generator interact with each other,
wherein while the first driving portion oscillates the mirror portion around the first axis, the second driving portion oscillates the movable portion around the second axis, so that the minor portion reflects a beam of light incident to the mirror portion such that the two-dimensional optical scanner performs a two-dimensional scanning.

13. The two-dimensional optical scanner according to claim 12, wherein the driving controller drives the first driving portion in a resonant condition.

14. The two-dimensional optical scanner according to claim 13, wherein the driving controller drives the second driving portion in a non-resonant condition.

15. The two-dimensional optical scanner according to claim 12,
wherein the mirror portion includes a reflective surface configured to reflect the beam of light incident to the mirror portion,
wherein the movable portion includes:
a pair of first beams connected to the minor portion and extends from both sides of the mirror portion on a parallel surface to the reflective surface of the mirror portion;
a pair of first plates connected to the pair of first beams, respectively, and each extends over both sides of the pair of first beams in a direction perpendicular to the pair of first beams, on the parallel surface;
a second plate connected to the pair of first plates on one side thereof in the direction perpendicular to the pair of first beams, on the parallel surface;
a second frame connected to the second plate and which surrounds the minor portion, the pair of first beams, the pair of first plates and the second plate on the parallel surface; and
a pair of second beams connected to both sides of the second frame in the direction perpendicular to the pair of first beams and which extends in the direction perpendicular to the pair of first beams on the parallel surface,
wherein the piezoelectric body is provided on the second plate,
wherein the coil is provided on the second frame, and
wherein while the first driving portion torsionally vibrates the pair of first beams such that the first driving portion oscillates the mirror portion around the first axis, the second driving portion vibrates the pair of second beams such that the second driving portion oscillates the movable portion around the second axis.

16. The two-dimensional optical scanner according to claim 15,
wherein the piezoelectric body is provided on one side of the second plate in a perpendicular direction to the reflective surface of the mirror portion, and
wherein the coil is provided along the second frame on the other side of the second frame in the perpendicular direction.

17. The two-dimensional optical scanner according to claim 15, further comprising:
a base having a recess portion in which the generator is provided; and
an installation portion connected to the pair of second beams and is provided on the base,
wherein the movable portion is provided above the recess portion,
wherein the generator is configured to generate the magnetic field in a direction parallel to the pair of first beams, and
wherein the second driving portion is driven by a Lorentz force generated by the driving electric current supplied to a side of the coil perpendicular to the pair of first beams and the magnetic field generated by the generator in the direction parallel to the pair of first beams.

18. An image display apparatus comprising:
the optical scanner according to claim 12;
a light source configured to emit a beam of light to the optical scanner; and
an optical system configured to guide a beam of light scanned by the optical scanner to an eye of a user.

* * * * *